United States Patent
Oguri et al.

(10) Patent No.: US 8,076,892 B2
(45) Date of Patent: Dec. 13, 2011

(54) STATOR POSITION ADJUSTMENT METHOD, MOTOR DRIVE DEVICE AND STATOR POSITION ADJUSTMENT SYSTEM

(75) Inventors: Yasunori Oguri, Nishio (JP); Tomotaka Murakami, Okazaki (JP); Yoshihiro Hirota, Anjo (JP); Akira Isogai, Anjo (JP); Takehito Jinno, Tokai (JP); Akira Takasaki, Toyota (JP); Tatsuhiko Mizutani, Toyota (JP); Hiroyuki Hattori, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 592 days.

(21) Appl. No.: 12/078,712

(22) Filed: Apr. 3, 2008

(65) Prior Publication Data
US 2008/0258668 A1    Oct. 23, 2008

(30) Foreign Application Priority Data

Apr. 18, 2007   (JP) ................. 2007-109889

(51) Int. Cl.
*G05B 1/06* (2006.01)
(52) U.S. Cl. .......... 318/652; 318/538; 318/539; 310/89; 310/419
(58) Field of Classification Search .......... 318/538, 318/539, 652; 324/207.26, 207.2; 29/402.01, 29/596; 310/89, 419
See application file for complete search history.

(56) References Cited

U.S. PATENT DOCUMENTS

| | | | |
|---|---|---|---|
| 6,566,783 B2 * | 5/2003 | Hatz et al. ................. 310/420 |
| 7,453,175 B2 * | 11/2008 | Nakanishi et al. .......... 310/68 B |
| 7,508,151 B2 * | 3/2009 | Hashimoto et al. ......... 318/538 |
| 7,586,304 B2 * | 9/2009 | Hashimoto et al. ....... 324/207.26 |
| 2003/0188419 A1 * | 10/2003 | Wingeier ................. 29/598 |
| 2004/0084233 A1 * | 5/2004 | Wakuta et al. ............. 180/65.2 |
| 2007/0130752 A1 | 6/2007 | Hashimoto et al. |
| 2007/0130753 A1 | 6/2007 | Hashimoto et al. |

(Continued)

FOREIGN PATENT DOCUMENTS

JP    07241050 A  *  9/1995

(Continued)

OTHER PUBLICATIONS

Machine translation of JP 07-241050 A (Sep. 12, 1995).*

(Continued)

*Primary Examiner* — Walter Benson
*Assistant Examiner* — Kawing Chan
(74) *Attorney, Agent, or Firm* — Oliff & Berridge, PLC

(57) ABSTRACT

A stator position adjustment method for a motor drive device that includes a motor case, a rotor shaft supported by the motor case in order to rotate a rotor inside the motor case, and a stator disposed at an outer circumference of the rotor concentrically with the rotor and having a configuration in which the stator is tightened and secured to the motor case by a tightening unit that tightens the stator along a rotor axis. The method includes the steps of setting a first tolerance range as a maximum tolerance range of a stator axis in which a first gap is formed between an outer circumference surface of the stator and an inner circumference surface of the motor case; measuring a position of the stator axis; and adjusting the position of the stator axis within the first tolerance range based on a measured position of the stator axis.

26 Claims, 17 Drawing Sheets

U.S. PATENT DOCUMENTS

| | | |
|---|---|---|
| 2007/0278979 A1 | 12/2007 | Hashimoto et al. |
| 2009/0284207 A1* | 11/2009 | Hosobata et al. ............ 318/611 |

FOREIGN PATENT DOCUMENTS

| | | |
|---|---|---|
| JP | A 10-136610 | 5/1998 |
| JP | A-05-245096 | 9/2005 |
| JP | A-2006-166554 | 6/2006 |
| JP | A 2006-197776 | 7/2006 |
| JP | A 2006-254519 | 9/2006 |
| JP | U-05-078156 | 4/2007 |
| JP | A-08-223875 | 9/2008 |
| WO | WO 2005/000620 A1 | 1/2005 |
| WO | WO 2007/066776 A1 | 6/2006 |
| WO | WO 2007/066774 A1 | 6/2007 |
| WO | WO 2007/066778 A1 | 6/2007 |

OTHER PUBLICATIONS

Partial English translation of Aug. 11, 2011 Office Action issued in Japanese patent application No. 2007-109889.

* cited by examiner

STATOR POSITION ADJUSTMENT METHOD, MOTOR DRIVE DEVICE AND STATOR POSITION ADJUSTMENT SYSTEM

INCORPORATION BY REFERENCE

The disclosure of Japanese Patent Application No. 2007-109889 filed on Apr. 18, 2007 including the specification, drawings and abstract is incorporated herein by reference in its entirety.

BACKGROUND

The present invention relates to a stator position adjustment method, motor drive device and stator position adjustment system.

There exists hybrid cars that include an engine and a motor drive device as a drive source. The hybrid cars have been attracting attention in terms of fuel consumption, environmental protection and the like. In hybrid cars of this type, the motor drive device acts as a motor that obtains electricity from a battery to generate a drive force so that the drive force is transmitted to a running mechanism side to run the hybrid car using the motor. The motor drive device may also obtain a drive force from an engine that also acts as a generator that is used for charging the battery. The motor drive device further performs a so-called regenerative operation in which an excess inertia force of the car is recovered as electricity during braking. The motor drive device may further be used for starting the engine. Thus, the rotor of the motor drive device included in the hybrid car is drive-coupled to the transmission side and the engine side to enable an exchange of the drive forces.

The motor drive device includes a stator and a rotor stored in the stator. The stator and rotor are shaft-supported from the motor case side. The stator is supported fixably, and the rotor is supported rotatably from a shaft support section provided to the motor case. In a hybrid car, the motor case is rarely provided individually, and normally, a part of a transmission case storing a speed change mechanism therein doubles as the motor case.

A hybrid drive device employed in such hybrid cars is introduced in WO2005/000620. According to the technology disclosed in this document, the hybrid drive device includes a first electric motor and a second electric motor.

SUMMARY

The schematic structure of the motor drive device employed in the hybrid drive device described above is roughly shown in FIG. 1 and FIG. 2. FIG. 1 shows a sectional view of the motor drive device, and FIG. 2 shows an exploded perspective view of the motor drive device.

In FIG. 1, the left side corresponds to an engine room ER side on which an engine E is disposed, and the right side corresponds to a speed change mechanism room TR side to which a speed change mechanism T is disposed.

A stator S includes a stator core SC and a stator coil SW for the stator core SC. The stator core SC is formed of a plurality of stacked steel sheets p that are approximately ring-shaped, as shown in FIG. 2, and is tightened and secured to the motor case by a tightening bolt b1 (corresponding to a tightening unit in the present invention) that penetrates the securing section, provided at a predetermined phase in the circumferential direction of each steel sheet p, in the stacked direction. Further, since the steel sheets p forming the stator core SC are subjected to a caulking process, a welding process, or the like, in the predetermined phase in the circumferential direction, a relative movement between the steel sheets p is restricted to a certain extent.

The position of the stator core in the horizontal direction (corresponding to the shaft direction of the rotor) in FIG. 1 is determined by the seat surface provided to the motor case. On the other hand, the position in the vertical direction (corresponding to the shaft radial direction of the rotor) is determined by the tightening of the tightening bolt b1.

Conventionally, the centering of the stator of this type (centering with respect to the center of a support shaft of the rotor set in the motor case that can be identified as the axis of the rotor) has been performed by determining a tolerance range of the axis of the stator so that the stator does not contact the rotor, thereby appropriately centering the stator within the motor case.

That is, the centering of the stator has been performed based on a predetermined reference that ensures a predetermined gap between the outer circumference surface of the rotor and the inner circumference surface of the stator, thereby allowing the rotor to rotate without contacting both of the surfaces.

In this case, there have been cases where a gap is formed between the outer circumference surface of the stator and the inner circumference surface of the motor case, and there have been cases where at least a part of the stator comes into contact with the inner circumference of the motor case.

However, it has been found that the stator may cause resonance due to some factors when at least a part of the stator is in contact with the motor case. Possible examples of such factors include resonance of the stator influenced by the rotation of the rotor, resonance of the stator due to vibration generated by a transmission and transmitted to the stator via the motor case, and the like, whereby the vibration generated from the motor drive device is amplified.

The present invention has been made in view of the problem described above, and has an object of obtaining a stator position adjustment method that can obtain a motor drive device with low stator-induced vibration (particularly sound) generated from the motor drive device, and of obtaining a stator position adjustment system that can perform such a stator position adjustment. The present invention can also achieve various other advantages.

An exemplary aspect of the invention includes a stator position adjustment method for a motor drive device that includes a motor case, a rotor shaft supported by the motor case in order to rotate a rotor inside the motor case, and a stator disposed at an outer circumference of the rotor concentrically with the rotor and having a configuration in which the stator is tightened and secured to the motor case by a tightening unit that tightens the stator along a rotor axis. The method includes the steps of setting a first tolerance range as a maximum tolerance range of a stator axis in which a first gap is formed between an outer circumference surface of the stator and an inner circumference surface of the motor case; measuring a position of the stator axis; and adjusting the position of the stator axis within the first tolerance range based on a measured position of the stator axis.

An exemplary aspect of the invention includes a stator position adjustment method for a motor drive device that includes a motor case, a rotor shaft supported by the motor case in order to rotate a rotor inside the motor case, and a stator disposed at an outer circumference of the rotor concentrically with the rotor and having a configuration in which the stator is tightened and secured to the motor case by a tightening unit that tightens the stator along a rotor axis. The method includes the steps of setting a first tolerance range as a maximum tolerance range of a stator axis in which a first gap is formed between an outer circumference surface of the stator and an inner circumference surface of the motor case; setting a second tolerance range as a maximum tolerance range of the stator axis in which a second gap is formed between an inner circumference surface of the stator and an outer circumference surface of the rotor, the first tolerance range being set less than or equal to the second tolerance range; measuring a position of the stator axis; and adjusting the position of the stator axis within the first tolerance range based on a measured position of the stator axis.

An exemplary aspect of the invention includes a motor drive device with a motor case; a rotor shaft supported by the motor case in order to rotate a rotor inside the motor case; and a stator disposed at an outer circumference of the rotor concentrically with the rotor. The motor drive device having a configuration in which the stator is tightened and secured to the motor case by a tightening unit that tightens the stator along a rotor axis. A stator axis being adjusted to a position within a first tolerance range as a maximum tolerance range of the stator axis in which a first gap is formed between an outer circumference surface of the stator and an inner circumference surface of the motor case throughout an entire circumference.

An exemplary aspect of the invention includes a motor drive device with a motor case; a rotor shaft supported by the motor case in order to rotate a rotor inside the motor case; and a stator disposed at an outer circumference of the rotor concentrically with the rotor. The motor drive device having a configuration in which the stator is tightened and secured to the motor case by a tightening unit that tightens the stator along a rotor axis. The motor drive device being set with a first tolerance range as a maximum tolerance range of a stator axis in which a first gap is formed between an outer circumference surface of the stator and an inner circumference surface of the motor case and a second tolerance range as a maximum tolerance range of the stator axis in which a second gap is formed between an inner circumference surface of the stator and an outer circumference surface of the rotor. The first tolerance range being set less than or equal to the second tolerance range, and the stator axis being adjusted to a position within the first tolerance range.

An exemplary aspect of the invention includes a stator position adjustment system for a motor drive device that includes a motor case, a rotor shaft supported by the motor case in order to rotate a rotor inside the motor case, and a stator disposed at an outer circumference of the rotor concentrically with the rotor and having a configuration in which the stator is tightened and secured to the motor case by a tightening unit that tightens the stator along a rotor axis. The system includes a storage unit that stores a first tolerance range as a maximum tolerance range of a stator axis in which a first gap is formed between an outer circumference surface of the stator and an inner circumference surface of the motor case; a measurement unit that measures a position of the stator axis; an adjustment unit that adjusts the position of the stator axis; and a controller that generates an adjustment command with respect to the adjustment unit to adjust the position of the stator axis within the first tolerance range based on the position of the stator axis measured by the measurement unit.

An exemplary aspect of the invention includes a stator position adjustment system for a motor drive that includes a motor case, a rotor shaft supported by the motor case in order to rotate a rotor inside the motor case, and a stator disposed at an outer circumference of the rotor concentrically with the rotor and having a configuration in which the stator is tightened and secured to the motor case by a tightening unit that tightens the stator along a rotor axis. The system includes a storage unit that stores a first tolerance range as a maximum tolerance range of a stator axis in which a first gap is formed between an outer circumference surface of the stator and an inner circumference surface of the motor case, and that stores a second tolerance range as a maximum tolerance range of the stator axis in which a second gap is formed between an inner circumference surface of the stator and an outer circumference surface of the rotor with the first tolerance range being set less than or equal to the second tolerance range; a measurement unit that measures a position of the stator axis; an adjustment unit that adjusts the position of the stator axis; and a controller that generates an adjustment command with respect to the adjustment unit to adjust the position of the stator axis within the first tolerance range based on the position of the stator axis measured by the measurement unit.

BRIEF DESCRIPTION OF THE DRAWINGS

Various exemplary aspects of the invention will be described with reference to the drawings wherein.

DETAILED DESCRIPTION OF EMBODIMENTS

In the description below, embodiments of the structure of a motor drive device M that is applied with the present invention, the structure of a stator position adjustment system 100 according to the present invention for appropriately assembling the motor drive device M, the position adjustment/securing operation of a stator S using the stator position adjustment system 100, and the assembly of the motor drive device M are described in order.

The motor drive device M of the present embodiment of the present invention can be employed in a hybrid drive device.

1 Motor drive device M

Figure 1:
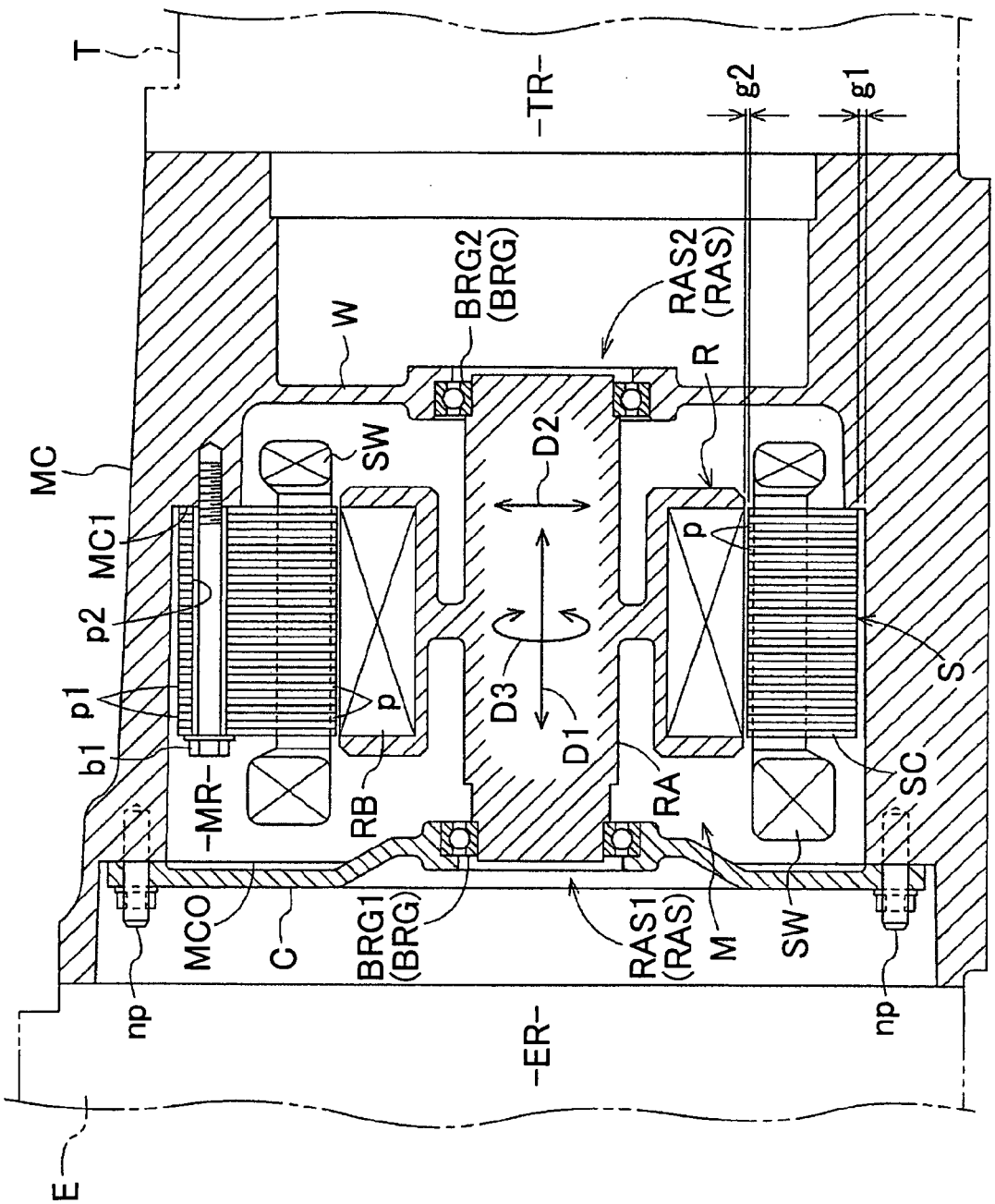
FIG. 1 is a view showing a sectional structure of a motor drive device.
Figure 2:
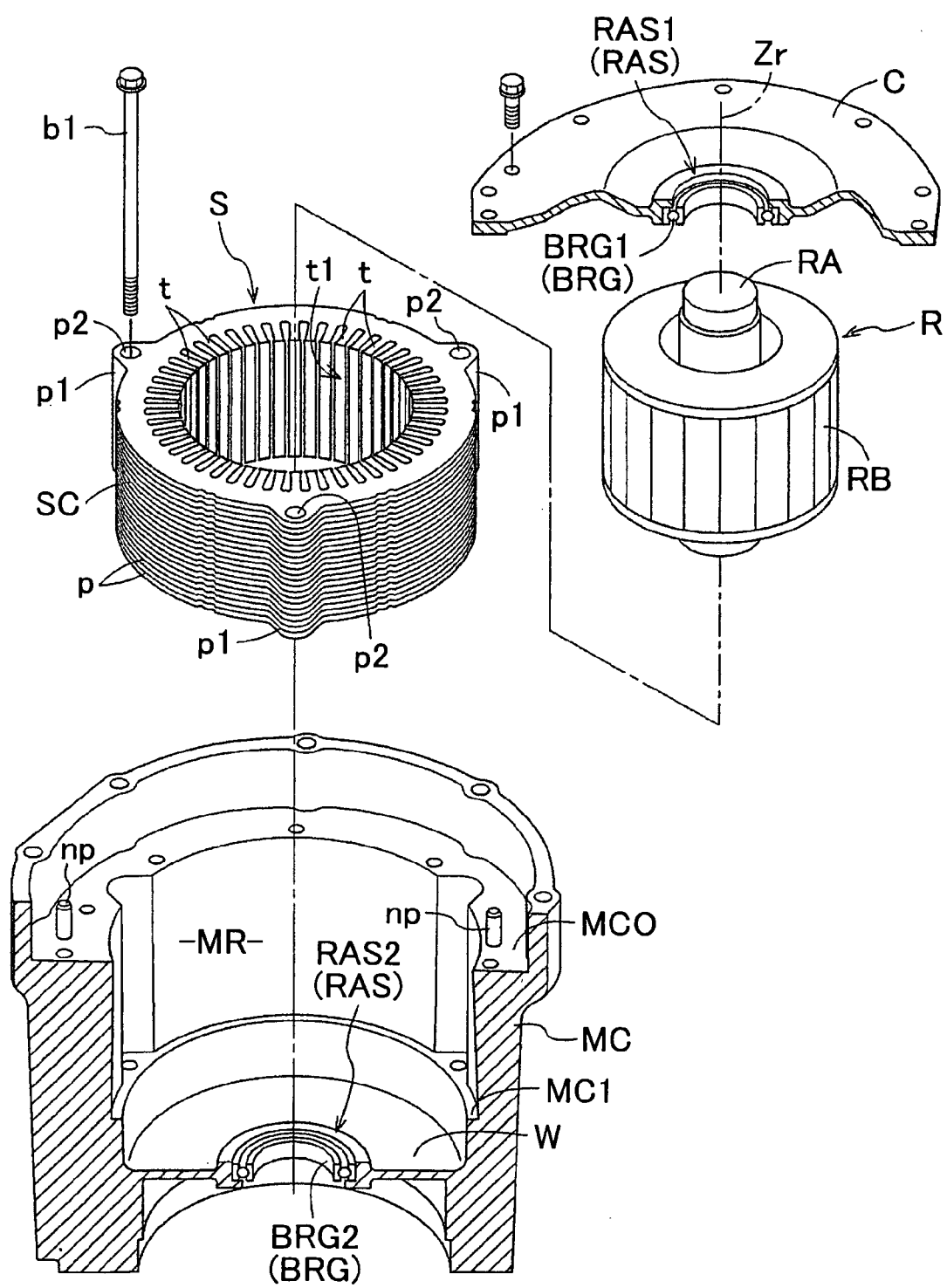
FIG. 2 is an exploded perspective view showing the structure of the motor drive device.

FIG. 1 is a drawing showing the sectional structure of the motor drive device M stored in a transmission case MC (one example of a motor case) in an assembled state, and FIG. 2 is a drawing showing the motor drive device M in a disassembled state in order to clarify the supporting structure of the stator S and a rotor R forming the motor drive device M.

In FIG. 1, the left side is an engine room ER side area in which an engine E is disposed, and the right side is a speed change mechanism room TR side area in which a speed change mechanism T is disposed. As described above, the rotor R of the motor drive device M is structured to be drive-coupled with the engine E and the speed change mechanism T, whereby a drive force can be exchanged with each thereof.

As can be seen from FIGS. 1 and 2, the motor drive device M includes the stator S and the rotor R. In the assembled state, an axis Zs of the stator S is adjusted within a certain tolerance range with respect to an axis Zr of the rotor R, and the axis position of the rotor R is determined by a pair of shaft support bearings BRG supported by the transmission case MC. The direction along the axis Zr is referred to simply as a shaft direction (direction shown by D1 in FIG. 1), the direction orthogonal thereto is referred to as a shaft radial direction (direction shown by D2 in FIG. 1), and the direction therearound is referred to as a shaft circumferential direction (direction shown by D3 in FIG. 1).

The stator S includes a stator core SC and a stator coil SW for the stator core SC. The stator core SC is formed of a plurality of stacked steel sheets p that are approximately ring-shaped, as shown in FIG. 2. The stacked direction coincides with the shaft direction D1. A configuration in which the relative movement between the steel sheets p is restricted by a caulking or welding process at a predetermined phase in the circumferential direction of each steel sheet p. Further, a protruding section p1 that protrudes in the radial direction is provided at three parts evenly in the circumferential direction for each steel sheet p, and a bolt insert hole p2 for tightening and securing the stator core SC to the transmission case MC is provided to each protruding section p1. The stator core SC having a stacked structure is tightened and secured to a seat surface MC1 provided to the transmission case MC by a tightening bolt b1 as a tightening unit. As can be seen from FIG. 1 and FIG. 2, the stator core SC of the motor drive device that is applied with the present invention has a relatively short length in the shaft direction, whereby the orthogonality of the stator axis Zr with respect to the seat surface MC1 is not extremely deteriorated even when the tightening to the transmission case MC is performed by the tightening bolt b1. That is, a substantially parallel relation between the axis Zr of the rotor and the axis Zs of the stator is maintained.

On the inner diameter side of each steel sheet p, teeth t that protrude in a comb-teeth form toward the inner diameter side are provided. The stator coil SW is wound through the air gap between the teeth t. The inner diameter side end surface t1 of the teeth t is an end surface extending in the circumferential direction.

The stator coil SW is impregnated with varnish to be secured in an insulating state. Further, the varnish is also impregnated between the steel sheets p so that the steel sheets p are secured in a state where entry of water and the like is prevented. The impregnation with the varnish improves thermal conductivity, and improves heat dissipation.

Regarding the positioning of the stator S in the transmission case MC, the positioning in the shaft direction D1 is determined by the end surface (mainly the end surface of the protruding section p1), shown on the right side in FIG. 1, of the stator core SC coming into contact with the seat surface MC1 provided to the transmission case MC. The stator storing space formed in the transmission case MC assumes a predetermined margin in the shaft radial direction D2 (vertical direction in FIG. 1), whereby the stator S has a predetermined play unless tightened to the transmission case MC using the tightening bolt b1. Thus, after the tightening of the tightening bolt b1, the axis position of the stator S in the shaft radial direction D2 with respect to the transmission case MC is determined.

The phase of the stator S in the shaft circumferential direction D3 with respect to the transmission case MC is determined based on the phase of the seat surface MC1, provided to the transmission case MC, in the shaft circumferential direction D3 with respect to the protruding section p1 described above, and is determined by an inserting operation of the stator S to the transmission case MC and the tightening operation by the tightening bolt b1.

The rotor R includes a rotor body RB around a rotor shaft RA. The rotor shaft RA is shaft-supported by both a shaft support bearing BRG1 provided on the engine room ER side and a shaft support bearing BRG2 provided on the speed change mechanism room TR side.

As can be seen from FIGS. 1 and 2, a motor drive device room MR is formed as an independent compartment between the engine room ER and the speed change mechanism room TR. In the example shown in the drawing, a partition wall W integral with the transmission case MC is provided between the motor drive device room MR and the speed change mechanism room TR, and the wall W is provided with the one shaft support bearing BRG2 for supporting the rotor R.

On the other hand, a partition cover C that is installed and secured to the transmission case MC is provided between the motor drive device room MR and the engine room ER. The partition cover C partitions the motor drive device room MR by covering the end surface opening MCO of the transmission case MC from the left side in FIG. 1. As can be seen from FIGS. 1 and 2, the position of the partition cover C in the shaft radial direction D2 and the shaft circumferential direction D3 is determined by a plurality of knock pins np provided to the end surface opening MCO. The partition cover C is provided with the other shaft support bearing BRG1 for supporting the rotor R.

As can be seen from the configuration described above, the rotor R of the motor drive device M is supported rotatably by the shaft support bearing BRG2 provided to the partition wall W and the shaft support bearing BRG1 provided to the partition cover C.

The specification of the rotor R, the stator S (the stator core SC), and the transmission case MC of the above-described motor drive device M is described based on FIG. 1 and FIGS. 3A-3E.

As shown in FIG. 1, a gap g1 referred to as a first gap in the present embodiment of the present invention is formed between the outer circumference surface of the stator S and the inner circumference surface of the transmission case MC. On the other hand, a gap g2 referred to as a second gap in the present embodiment of the present invention is formed between the outer circumference surface of the rotor R and the inner circumference surface of the stator S.

In the present embodiment of the present invention, the position of the inner circumference of the transmission case MC is set to a unique position in order to reliably ensure the first gap g1 and the second gap g2. Further, in order to ensure the first gap g1 and the second gap g2, a predetermined relation between a first tolerance range Tr1 for ensuring the first gap g1 from the transmission case MC as the reference and a second tolerance range Tr2 for ensuring the second gap g2 from the rotor R as the reference is held in advance as a tolerance range of the stator axis Zs with respect to an axis Z (that coincides with the axis Zr of the rotor) set for the transmission case MC. Specifically, the first tolerance range Tr1 is selected/set to be less than or equal to the second tolerance range Tr2.

The relation among these specifications is described with reference to FIGS. 3A-3E. The example shown in FIGS. 3A-3E is an example in which the first tolerance range Tr1 is selected to be smaller than the second tolerance range Tr2.

In FIGS. 3A-3E, the axis Z (the axis Zr of the rotor) set approximately in the central area of the transmission case MC in the horizontal direction is shown. The position of the outer circumference surface of the rotor R is shown by rectangular box symbols in a varying manner with respect to the axis thereof. On the other hand, the position of the stator S (the stator core SC) is shown by rectangular box symbols with an X mark therein. Further, the position of the inner circumference surface of the transmission case MC is shown by bold lines. In the same drawing, the first tolerance range Tr1 and the second tolerance range Tr2 are shown.

Figure 3:
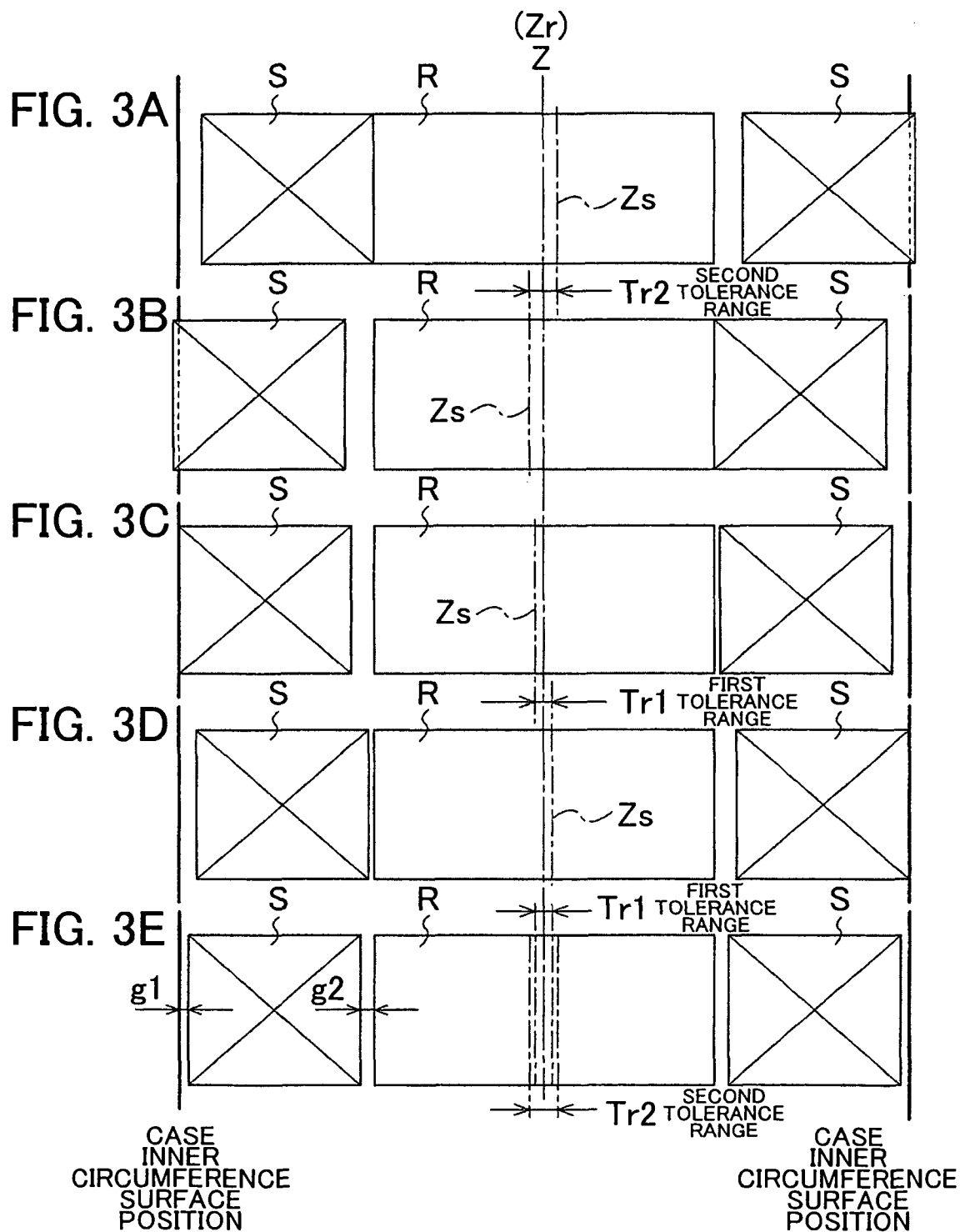
FIGS. 3A-3E are explanatory views showing the positional relation of a rotor, a stator core, and a motor case.

FIGS. 3A and 3B are views for illustrating the second tolerance range Tr2. FIG. 3A shows a state where the stator S is adjusted to the right with respect to the rotor R (state where the stator S is in contact with the rotor R from the left side), and FIG. 3B shows a state where the stator S is adjusted to the left with respect to the rotor R (state where the stator S is in contact with the rotor R from the right side). Thus, in the case where it is necessary to ensure the second gap g2 according to the present embodiment of the present invention, the second tolerance range Tr2 is set slightly inside the position of the stator axis Zs in the positional relation shown in FIGS. 3A and 3B, and the position of the stator axis Zs is adjusted within the tolerance range. This adjustment method is a related-art adjustment method. However, in this case, a state where the stator S contacts the transmission case MC is within tolerance.

In these FIGS. 3A and 3B, the outer circumference surface (thin solid lines at the outermost position in the horizontal direction) of the stator S, shown by the rectangular box symbols with an X mark therein, shows a limit position as to where the stator S can be positioned in order to ensure the second gap g2.

In this example, the position of the inner circumference surface of the transmission case MC (position of solid bold lines) is selected/set inside the limit position described above. That is, in the case where the stator S moves in the horizontal direction, the positional relation in which the stator S contacts the transmission case MC before the stator S comes into contact with the rotor R is ensured.

FIGS. 3C and 3D are views for illustrating the first tolerance range Tr1. FIG. 3C shows a state where the stator S is adjusted to the left (state where the stator S is in contact with the transmission case MC on the left side), and FIG. 3D shows a state where the stator S is adjusted to the right (state where the stator S is in contact with the transmission case MC on the right side). Thus, in the case where it is necessary to ensure the first gap g1 according to the present embodiment of the present invention, the first tolerance range Tr1 is set slightly inside the position of the stator axis Zs in the positional relation shown in FIGS. 3C and 3D, and the position of the stator axis Zs is necessary to be adjusted within the tolerance range.

In the present embodiment of the present invention, the position of the inner circumference surface of the transmission case MC is set as described above, and the position of the rotor axis Zr is adjusted within the first tolerance range Tr1.

Accordingly, as shown in FIG. 3E, the first gap g1 and the second gap g2 can be ensured, whereby a contact between the rotor R and the stator S can be avoided even in the case where an unexpected horizontal movement of the stator S has occurred.

2. Stator Position Adjustment System

The stator position adjustment system 100 is intended to adjust the stator S to an appropriate position with respect to the rotor axis Zr determined in the transmission case MC, in a state where the stator S is stored in the transmission case MC.

Figure 9:
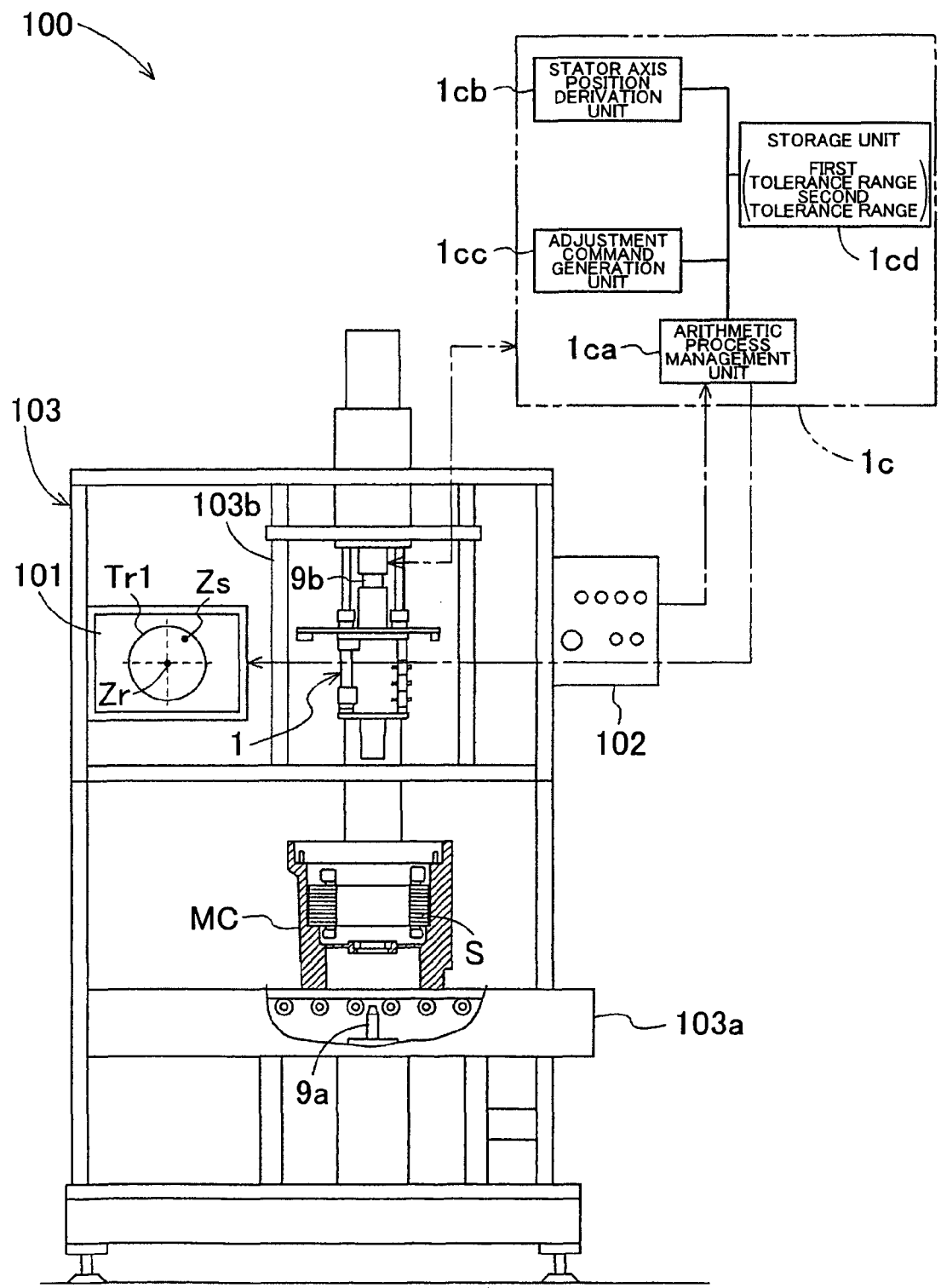
FIG. 9 is a view showing an entire front configuration of a stator position adjustment system.
Figure 10:
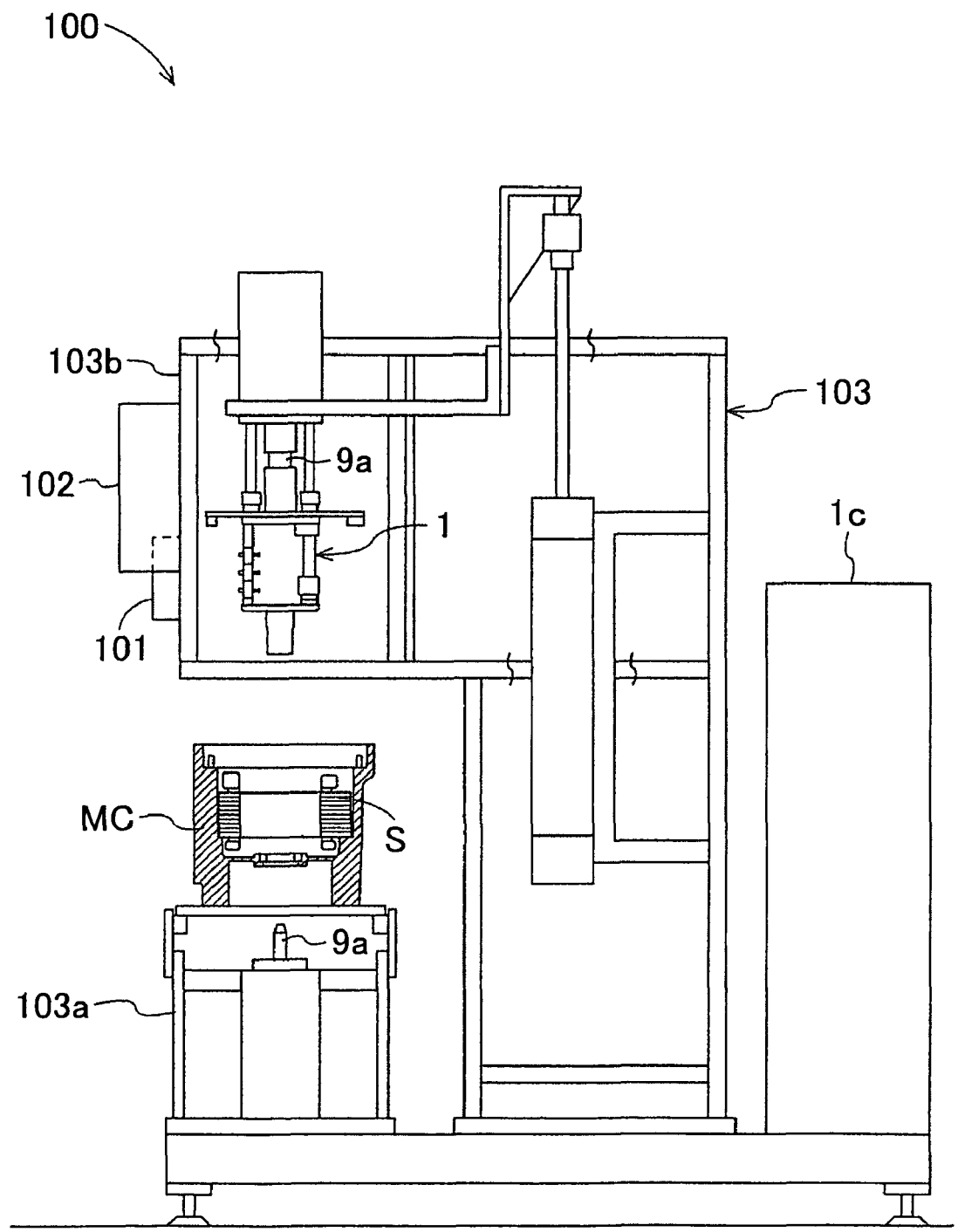
FIG. 10 is a view showing an entire side configuration of the stator position adjustment system.

To this end, as shown in FIG. 9 and FIG. 10, the system 100 includes a measurement adjustment device 1 having a configuration unique to the present invention, and includes an arithmetic process section 1c that generates an adjustment command with respect to the measurement adjustment device 1.

Overall Schematic Structure

In the stator position adjustment system 100, an operation panel 102 for operation of the stator position adjustment system 100 itself is provided, and each area of a basic body frame 103 includes a work disposition section 103a in which a work piece, i.e., the transmission case MC, is disposed and a measurement adjustment device support section 103b that supports the measurement adjustment device 1 described below in a suspended state. In addition, the stator position adjustment system 100 includes the arithmetic process section 1c formed of a computer that performs a predetermined arithmetic process based on the measurement result of the measurement adjustment device 1.

At the measurement adjustment device support section 103b, the measurement adjustment device 1 is capable of moving in the vertical direction of the system. On the other hand, a configuration is employed in which a work piece can be secured at the work disposition section 103a and in which the work disposition section 103a can determine the position of the work piece three-dimensionally.

As shown in FIG. 9, the operation panel 102 operated by an operator is provided to the right side and a display device 101 is provided to the left side, of the stator position adjustment system 100. The display device displays the position of the stator axis Zs with respect to the rotor axis Zr and the tolerance range Tr1 thereof, whereby the operator can check the progress of an operation while looking at the display of the display device 101 and perform an appropriate operation.

The specific configuration of the measurement adjustment device is first described below.

2-1 Measurement Adjustment Device

FIGS. 4 to 8 show the configuration of the measurement adjustment device 1.

Figure 4:
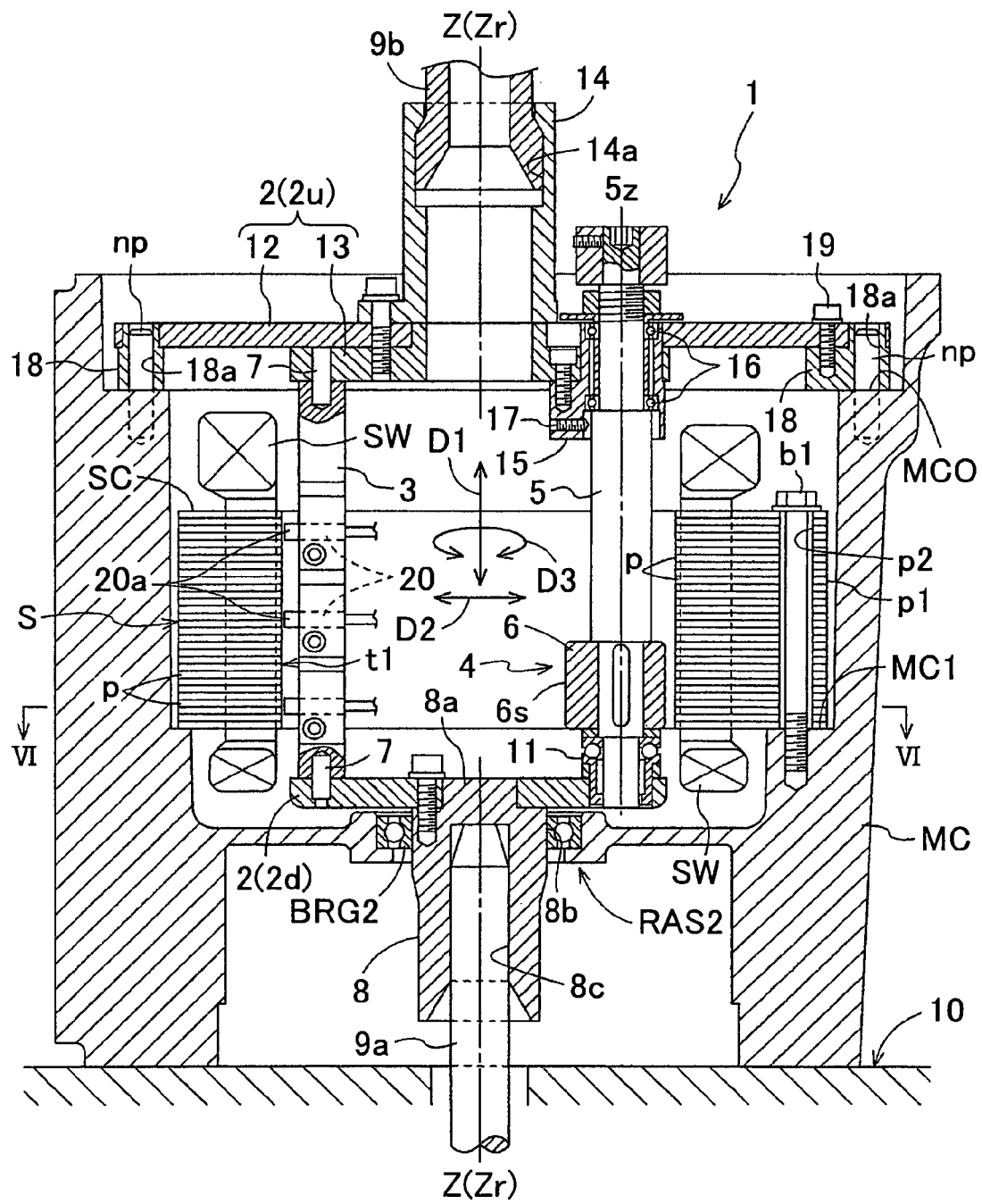
FIG. 4 is a longitudinal-sectional view of a measurement adjustment device in use.

FIG. 4 is a sectional view of a main section for showing the configuration of the measurement adjustment device 1, and shows a situation where the measurement adjustment device 1 is disposed to be capable of measuring and adjusting the position of the stator S in a state where the stator S is inserted in the transmission case MC.

Figure 5:
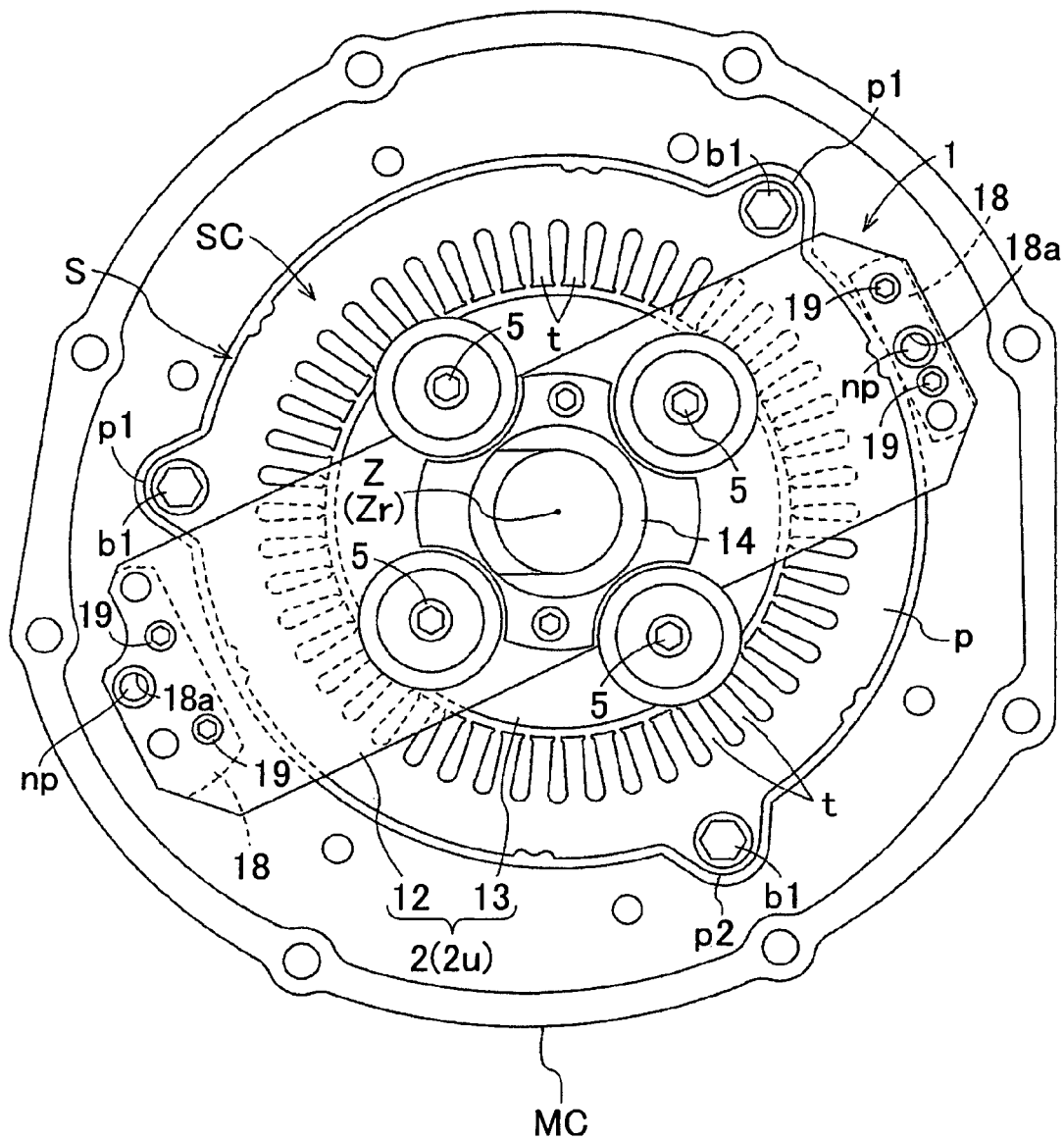
FIG. 5 is a plan view of the measurement adjustment device in use.
Figure 6:
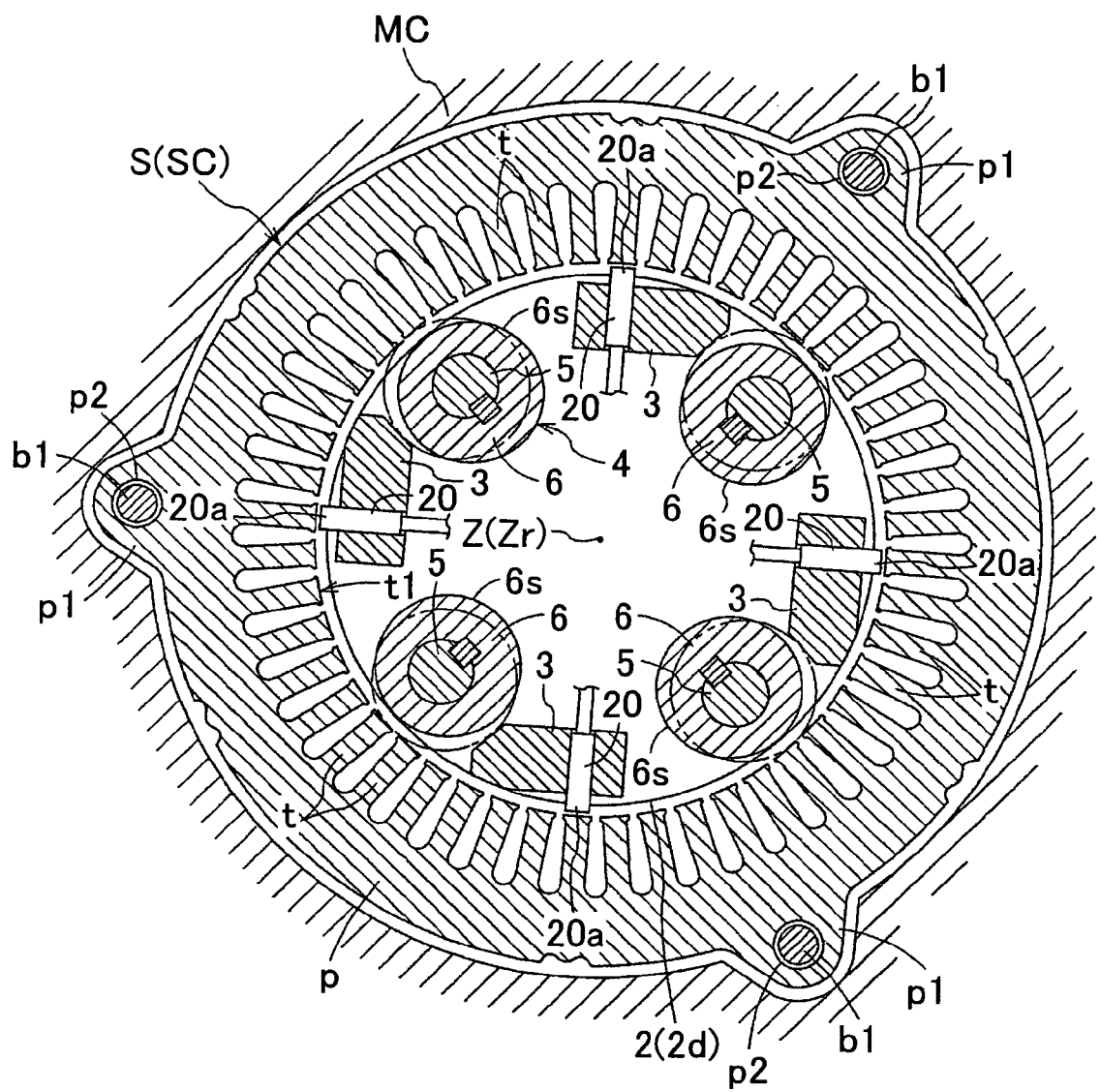
FIG. 6 is a sectional view showing a section along line VI-VI in FIG. 4.
Figure 7:
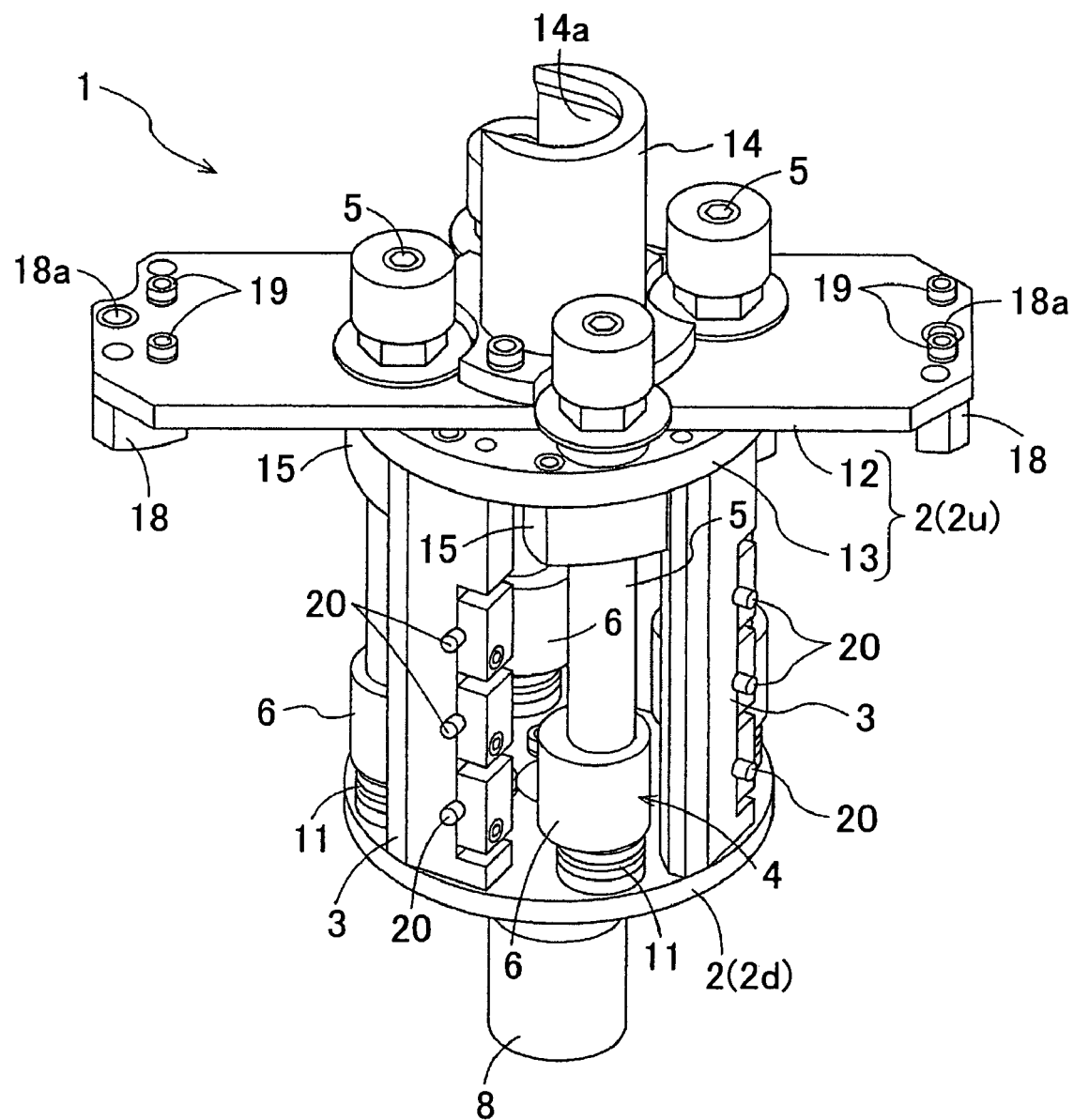
FIG. 7 is a perspective view of the measurement adjustment device.
Figure 8:
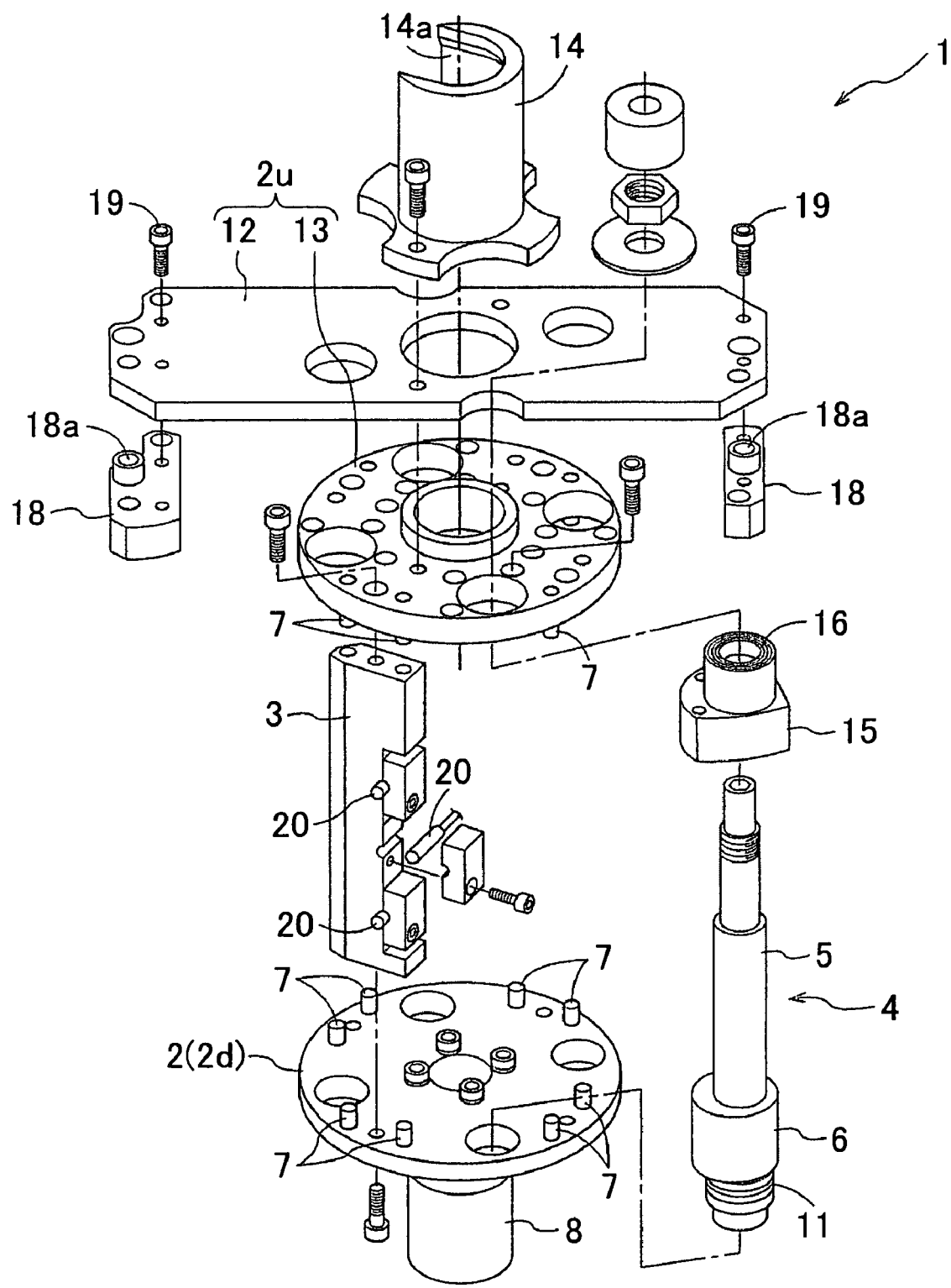
FIG. 8 is an exploded view of the measurement adjustment device.

FIG. 5 is a plan view corresponding to FIG. 4, FIG. 6 shows a section along line VI-VI of FIG. 4, and FIG. 7 is a perspective view showing only the measurement adjustment device 1. Further, FIG. 8 is an exploded view thereof.

The measurement adjustment device 1 stores the stator S in the transmission case MC, supports the stator S in the shaft direction D1 of the rotor R, and performs a measurement of the position of the stator S (position of the stator S in the shaft radial direction D2) in a rotor uninserted state in which the rotor R is not inserted in the stator S. Further, the measurement adjustment device 1 is structured to adjust the position of the stator S (position of the axis Zs of the stator S with respect to the rotor axis Zr in a supported state by the transmission case MC) based on the measurement result. In addition, the measurement adjustment device 1 determines the axis thereof (shown as Z in FIG. 4) from both a case side shaft support section RAS2 and a cover side shaft support section RAS1. As described below, the axis Zs of the stator can be determined as an average value of the centers of the circles of the stator (average position of the centers of the circles) measured at three parts in the circumferential direction.

As can be seen from FIG. 4, FIG. 6, FIG. 7, and FIG. 8, the measurement adjustment device 1 has a configuration in which a vertical pair of end surface plates 2 in FIG. 4 is secured and coupled by sensor servers 3 provided at four parts in the shaft circumferential direction D3. Between the vertical pair of end surface plates 2, four stator position adjustment mechanisms 4 are engaged evenly between each sensor server 3. The stator position adjustment mechanism 4 includes a camshaft 5 disposed in the shaft direction D1 and an eccentric cam 6.

Of the upper and lower end surface plates 2, an end surface plate 2d on the lower side is formed as a ring-shaped end surface plate 2d having an approximately ring shape, and four sensor servers 3 are secured and coupled at an area in the vicinity of the outer circumference of one end surface thereof. Each sensor server 3 is positioned precisely on the ring-shaped end surface plate 2d using a pair of pins 7. A guide shaft 8 is secured to the center of the end surface on the opposite side of the end surface to which the sensor server 3 is secured and coupled.

The guide shaft 8, as shown in FIG. 4, includes a coupling section 8a with the ring-shaped end surface plate 2d on the upper end side, and includes an engagement section 8b that engages with the shaft support bearing BRG2 forming the case side shaft support section RAS2 described above in the outer circumference area. On the other hand, the guide shaft 8 includes a first center shaft entrance hole 8c, in which a first center shaft 9a is inserted, in the center on the lower end side. The first center shaft 9a is a guidance member provided to the stator position adjustment system 100 to be used during the operation of securing the stator S to the transmission case MC, and is provided movably in a direction along the axis Z that is the shaft direction D1 at an origin determined on an orthogonal plane with respect to the axis Z shown in FIG. 4. In the securing operation, the first center shaft 9a and a second center shaft 9b described below are disposed at a position of a rotational axis of the rotor R as a hypothetical reference for the operation.

The ring-shaped end surface plate 2d is provided with a connection support section, including a support bearing 11 that supports the camshaft 5 rotatably, evenly at four parts in the shaft circumferential direction D3. As the support bearing 11, a bearing that can bear a thrust load from the camshaft 5 in the shaft direction D1 is employed.

Of the upper and lower end surface plates 2, an end surface plate 2u located on the upper side is formed of a rectangular plate 12 having an approximately rectangular shape and a coupling plate 13 having an approximately ring shape in a planar view shown in FIG. 5. A configuration is employed in which the rectangular plate 12 and the coupling plate 13 are bolted integrally.

The other ends of the four sensor servers 3 described above are secured and coupled in an area in the vicinity of the outer circumference of the coupling plate 13. Each sensor server 3 is precisely positioned using the pair of pins 7 in the coupled area as well. The rectangular plate 12 is positioned on the end surface on the opposite side of the end surface to which the sensor server 3 is secured and connected. As shown in FIG. 4, a transfer handle 14 is secured to the rectangular plate 12.

The transfer handle 14 is bolted to the rectangular plate 12 on the end surface on the opposite side of the sensor server 3, and includes a center shaft penetration hole 14a in which the second center shaft 9b is inserted in the inner diameter area. The second center shaft 9b is used for transferring the measurement adjustment device 1, and is used together with the first center shaft 9a for determining a reference position for the securing operation.

The coupling plate 13 is provided with a connection support section 15, which supports the camshaft 5 rotatably, evenly at four parts in the shaft circumferential direction D3. The connection support section 15 is provided with a pair of radial bearings 16 so as to suitably center the camshaft 5 in the shaft direction D1, and is further provided with a stud bolt 17 for appropriately stopping the rotation of the camshaft 5.

In the vicinity of the end of the rectangular plate 12 in the longitudinal direction, pin engaging members 18 for positioning the rectangular plate 12 are respectively coupled utilizing a knock pin np provided to the end surface opening MCO of the transmission case MC. The pin engaging members 18, as can be seen from FIG. 5, are secured to each end of the rectangular plate 12 in the longitudinal direction by a pair of bolts 19, and each pin engaging member 18 includes a positioning hole 18a for the knock pin np to enter. As shown in FIG. 4, the pin engaging member 18 is provided to the end surface forming the end surface opening MCO of the transmission case MC in a state where the knock pin np has entered the positioning hole 18a.

In the measurement adjustment device 1, the device 1 can be positioned in the shaft direction D1, the shaft radial direction D2, and the shaft circumferential direction D3 with respect to the transmission case MC by causing the guide shaft 8 to enter the shaft support bearing BRG2 included in the case side shaft support section RAS2 and causing the knock pin np to enter the positioning hole 18a of the pin engaging member 18 provided on the longitudinal ends of the rectangular plate 12.

That is, the device 1 is positioned in the shaft radial direction D2 by the case side shaft support section RAS2, and is positioned in the shaft direction D1 and the shaft circumferential direction D3 by the knock pin np and the positioning hole 18a.

The relative position in the shaft circumferential direction D3 of the measurement adjustment device 1 that is positioned in the transmission case MC by the knock pin np and the positioning hole 18a, and the stator S that is tightened and secured to the transmission case MC by the tightening bolt b1, is determined by the relative position of the knock pin np and the positioning hole 18a with respect to the tightening bolt b1. The relative position in the shaft circumferential direction D3, as shown in FIG. 6, is set such that a sensor tip 20a of a displacement sensor 20 supported by the device 1 and an inner diameter side end surface t1 of the teeth t provided to the stator S are arranged to face each other in a state where the centers each approximately coincide. Thus, the gap between the sensor tip 20a and the inner diameter side end surface t1 can be accurately measured by the displacement sensor 20.

Note that other units such as a bolt, a bolt hole, and the like instead of the knock pin np and the positioning hole 18a may be employed as a positioning unit that positions the device 1 in the transmission case MC.

2-2 Measurement and Adjustment of Stator Position

The positioning configuration regarding the measurement adjustment device 1 of the stator position has been described. Below is a description regarding the measurement and adjustment of the position of the stator axis Zs.

As shown in FIG. 4, FIG. 6, FIG. 7, and FIG. 8, the displacement sensor 20 is supported by the sensor server 3 as a support body so as to be capable of measuring the position of the inner diameter surface of the stator core SC forming the stator S with respect to the rotor axis Zr. Specifically, three displacement sensors 20 are provided to each sensor server 3 provided evenly at four parts in the shaft circumferential direction D3.

As the displacement sensor 20, an eddy current displacement sensor for a conductive material, which utilizes the change of eddy current in the conductive material caused by an electromagnetic induction, is employed. The three displacement sensors 20 are appropriately disposed approximately evenly, according to the width of the stator core SC shown in FIG. 4 in the shaft direction D1, at three parts including the vicinity of both ends thereof, so as to measure the gap between the sensor tip 20a and the inner diameter side end surface t1 that is the tip surface of the teeth t. Accordingly, the position of the stator S in the shaft direction D1 with respect to the rotor axis Zr can be recognized.

Therefore, the three displacement sensors 20 disposed at each sensor server 3 can recognize the positional state of each section of the stator S along the shaft direction D1.

The displacement sensor 20 can accurately measure the position of the inner diameter side end surface t1 of the stator core SC while eliminating the influence of a substance other than a magnetic material and the conductive material that intervene between the displacement sensor 20 and the stator core SC, particularly of varnish adhering to the surface of the stator core SC in the radial direction, since the displacement sensor 20 is a non-contact displacement sensor, such as the eddy current displacement sensor that selectively responds to the magnetic material or the conductive material.

On the other hand, as previously shown, the sensor server 3 is provided evenly at four parts in the shaft circumferential direction D3, whereby the position of each section of the stator S along the shaft circumferential direction D3 can be recognized, and the position of the center of the circle of the stator S can be recognized from outputs of the displacement sensors 20 at four parts in the shaft circumferential direction D3. In addition, the displacement sensor 20 obtains the position of the stator axis Zs (average position of the centers of the circles shown in FIG. 3B) as the average value of the position of the center of the circle of the stator S in each position in the shaft direction D1.

That is, in the measurement adjustment device 1 according to the present embodiment of the present invention, a measurement unit is formed of the pair of end surface plates 2 connected by the sensor server 3, members attached to these end surface plates 2, and the displacement sensor 20. In addition, a support body is formed of a mechanism, i.e., the pair of end surface plates 2, the sensor server 3, the guide shaft 8, the pin engaging member 18, and the like, which positions and supports the displacement sensor 20 with respect to the shaft support section RAS of the rotor as the reference.

As a result, in the measurement adjustment device 1, the axis Z of the measurement adjustment device 1 can be caused to coincide with the hypothetical axis Zr of the rotor, whereby the position of the axis Zs of the stator with respect to the axis Zr of the rotor can be determined precisely by obtaining the output from the displacement sensor 20 as described above. That is, the measurement adjustment device 1 acts as the measurement unit of the present embodiment of the present invention.

As shown in FIG. 4, FIG. 6, FIG. 7, and FIG. 8, the eccentric cam 6 is provided to each camshaft 5 provided evenly at four parts in the shaft circumferential direction D3. The camshaft 5 is rotated according to the adjustment command from the arithmetic process section 1c described above. The eccentric cam 6, as shown in FIG. 4 and FIG. 6, includes a cam surface 6s that is eccentric with respect to an axis 5z of the camshaft 5. Therefore, the cam surface 6s can range from a position close to the axis 5z of the camshaft 5 to a position apart from the same in accordance with the rotation of the camshaft 5. As can be seen from FIG. 4 and FIG. 6, the cam surface 6s is capable of moving the stator S in the shaft radial direction D2 by pressing the inner circumference surface of the stator core SC (the inner diameter side end surface t1 of the teeth t), since the cam surface 6s is disposed to come into contact with the inner circumference surface of the stator core SC in the vicinity of the position apart from the axis 5z.

The adjustment in the shaft radial direction D2 has been described above, but the measurement adjustment device 1 also has a unique feature in the disposition of the cam 6.

As shown in FIG. 4 and FIG. 7, the cam 6 is disposed at a position corresponding to the lower end section of the stator core SC in the shaft direction D1. The position is a position in which the stator core SC comes into contact with the seat surface MC1 in a state where the stator core SC is inserted in the transmission case MC. Specifically, in this example, the cam 6 is arranged such that the lower end surface (bottom surface) of the cam 6 is approximately flush with the seat surface MC1 of the transmission case MC supporting the lower end surface of the stator core SC (stator S).

As described below, the adjustment of the stator position using the measurement adjustment device 1 is performed in a vertical posture in which the opening MCO of the transmission case MC is opened on the upper side. In this situation, the load of the stator S is applied on the steel sheet p forming the stator core SC in the vicinity of the seat surface MC1, whereby it is most preferable to adjust the position of the steel sheet p in this area. According to a study by the inventors, in the case where the upper side area of the stator core SC in the vertical direction (shaft direction D1) is pressed by the cam 6 in a state where the vertical posture is maintained during the adjustment, the movement of the steel sheet p in contact with the seat surface MC1 is made difficult merely by an inclination of the stator S itself as a whole with respect to the shaft direction D1, resulting in a maladjustment in some cases due to the steel sheet p returning to an original state after the adjustment by the eccentric cam 6.

Thus, in the measurement adjustment device 1, the position of the cam is set in the vicinity of the lower end of the stator core SC as described above, whereby the position of the stator S in the shaft radial direction D2 can appropriately be adjusted in each section along the shaft circumferential direction D3 utilizing the eccentric cam 6 arranged evenly in the shaft circumferential direction D3. That is, the measurement adjustment device 1 also acts as the adjustment unit of the present embodiment of the present invention.

2-3 Arithmetic Process Section

The measurement adjustment device 1 includes the arithmetic process section 1c formed of a computer that performs a predetermined arithmetic process based on the measurement result.

The arithmetic process section 1c includes an arithmetic process management unit 1ca that manages the process in the arithmetic process section 1c, a stator axis position derivation unit 1cb that derives the position of the stator axis Zs, an adjustment command generation unit 1cc that generates an adjustment command, and a storage unit 1cd.

Arithmetic Process Management Unit 1ca

The arithmetic process management unit 1ca manages the operation of each unit (the stator axis position derivation unit 1cb and the adjustment command generation unit 1cc) included in the arithmetic process section 1c.

Stator Axis Position Derivation Unit 1cb

The stator axis position derivation unit 1cb derives the position of the stator axis Zs with respect to the rotor axis Zr based on measurement information obtained from the measurement adjustment device 1. That is, in the process of the stator axis position derivation unit 1cb, the position of the center of the circle for each detection position provided at three parts in the shaft direction is determined, and the position of the stator axis Zs as the average of the three parts (average position of the centers of the circles) is determined from the determined positions of the center of the circle in each position.

Adjustment Command Generation Unit 1cc

The adjustment command generation unit 1cc generates the adjustment command for causing the position of the stator axis Zs to substantially coincide with the rotor axis Zr. The adjustment command generation unit 1cc first derives the distance spaced between the position of the stator axis Zs and the position of the rotor axis Zr and the direction thereof in a plane, the plane being orthogonal to the rotor axis Zr and at a height in the shaft direction in which the average described above is taken. The adjustment command generation unit 1cc then determines the cam 6 to be adjusted (which cam 6 to be adjusted) and an adjustment amount (the degree of rotation) of the cam 6 as the adjustment command, regarding the plurality of cams 6 included in the measurement adjustment device 1.

In this embodiment, the degree of rotation for each cam 6 corresponding to the eccentric state of the stator axis Zs with respect to the rotor axis Zr is derived according to a conversion formula obtained in advance, since a measurement point and an adjustment point are each provided evenly at four points in the circumferential direction. In this embodiment, only the adjustment amount necessary in the case of pressing the stator outward in the radial direction is derived.

3 Adjustment of Stator Position

A series of operations for measuring the position of the stator S, performing an adjustment based on the measurement result, and securing the stator S to the transmission case MC using the measurement adjustment device 1 is described below.

Figure 11:
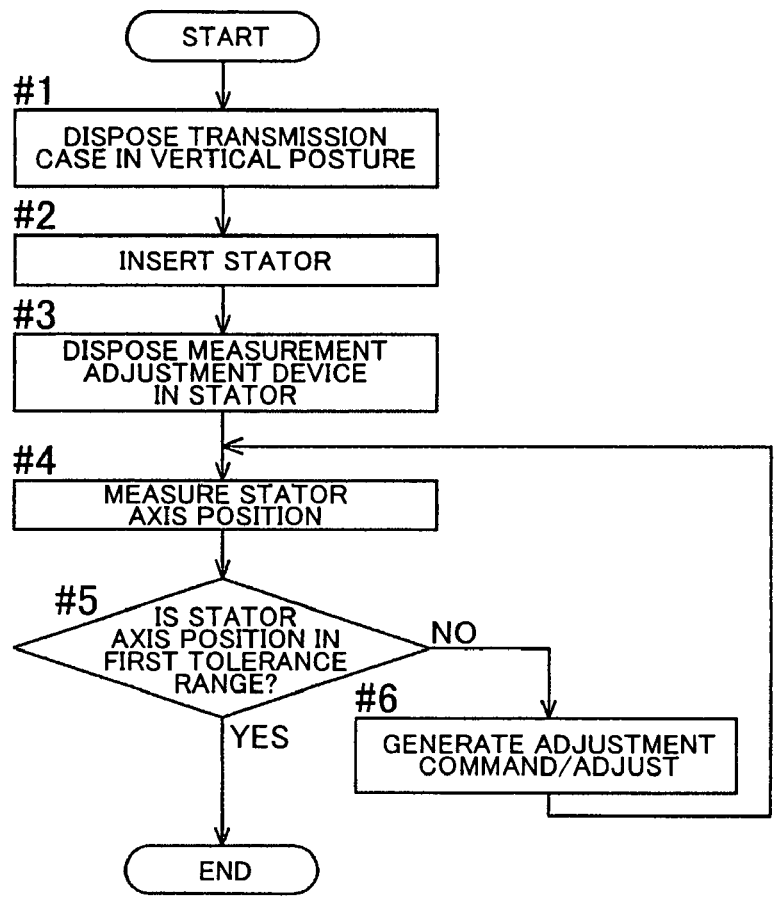
FIG. 11 is a flowchart showing the steps of an adjustment operation.

The series of operation is performed in the order of a vertical arrangement step of arranging the transmission case MC in a vertical posture on the stator position adjustment system 100, a stator insertion step of inserting the stator S in the transmission case MC, a disposition step of disposing the measurement adjustment device 1 in the stator S, a measurement step of determining the position of the stator axis Zs using the measurement adjustment device 1 in an inserted state, and an adjustment step of performing an adjustment of the stator position based on the measurement result obtained in the measurement step. Further, the operation is performed in the order of a tightening step of tightening the stator S in the transmission case MC in a state where the position of the stator axis Zs is adjusted within the first tolerance range Tr1, and a subsequent checking. FIG. 11 shows the flowchart to the adjustment step.

3-1 Vertical Arrangement Step (Step #1)

The transmission case MC is disposed in a vertical posture on the stator position adjustment system 100 in this step.

Figure 12:
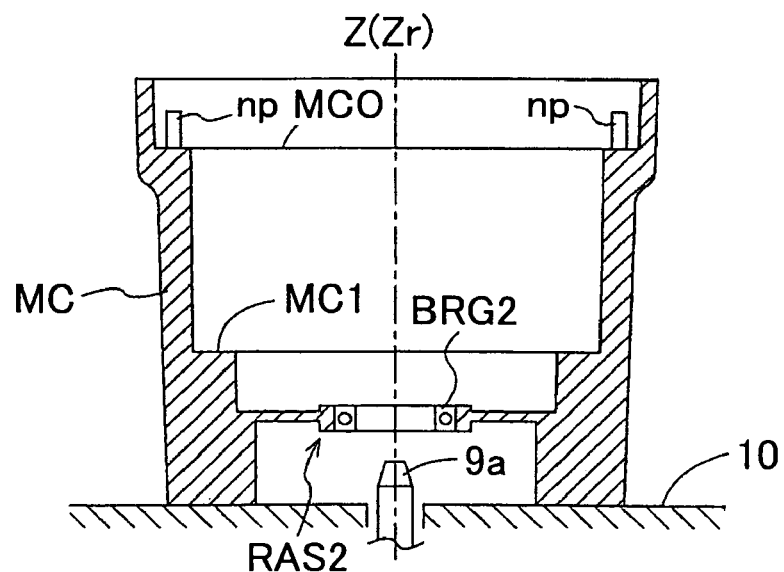
FIG. 12 is a view showing a state where a transmission case is arranged vertically to the stator position adjustment system.

That is, as shown in FIG. 12, the transmission case MC is disposed on upper surface 10 of the work disposition section 103a such that the end surface opening MCO of the transmission case MC is on the upper side and the case side shaft support section RAS2 provided to the transmission case MC is on the lower side. The axis Z of the first center shaft 9a provided to the stator position adjustment system 100 and the hypothetical axis Zr of the rotor determined in the transmission case MC are obviously caused to coincide.

The transmission case MC is incorporated with the shaft support bearing BRG2 forming the case side shaft support section RAS2 at this time, and further is in a state where the knock pin np is driven to a predetermined area of the end surface opening MCO. The two types of members, BRG2 and np, are utilized to determine the position of the measurement adjustment device 1 and consequently the position of the stator S.

3-2 Stator Insertion Step (Step #2)

Figure 13:
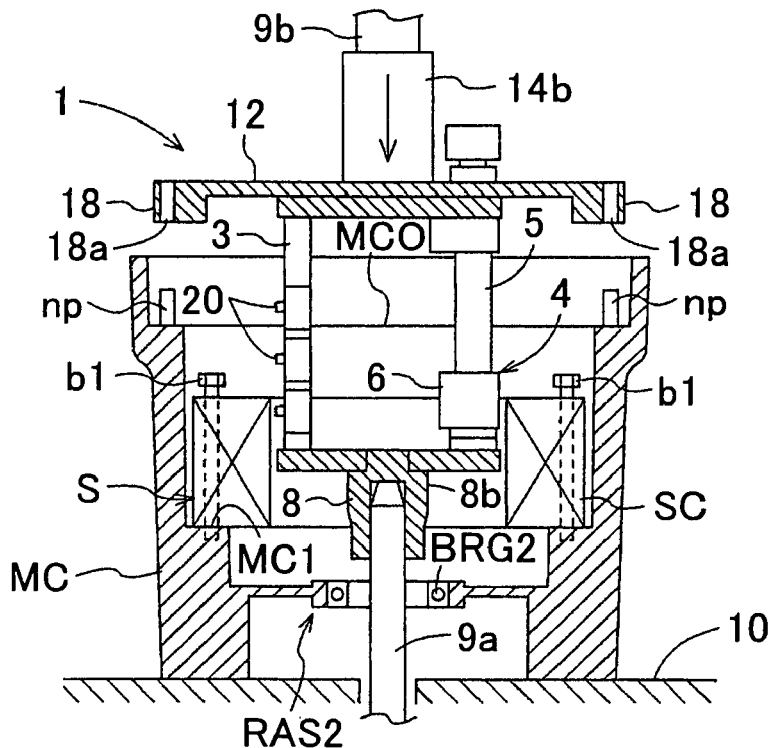
FIG. 13 is a view showing a state where the measurement adjustment device is inserted in the stator.

As shown in FIG. 13, the stator S is inserted in the transmission case MC in a vertical posture. The inserting operation is performed in a state where the stator S is dropped in the transmission case MC, whereby the stator S is supported by the seat surface MC1 provided to the transmission case MC. In a state where the insertion is completed, the vertical direction position (position in the shaft direction D1) of the stator S is determined, and the relative phase relation between the transmission case MC and the stator S (position in the shaft circumferential direction D3) is also approximately determined. On the other hand, as described above, a slight play is accepted in the horizontal direction (position in the shaft radial direction D2).

3-3 Disposition Step (Step #3)

As shown in FIG. 13, the measurement adjustment device 1 is disposed in the transmission case MC in which the stator S is inserted. The disposition is performed using the second center shaft 9b while suspending the measurement adjustment device 1 from the transfer section 14b provided to the measurement adjustment device support section 103b, in a state where the first center shaft 9a is inserted in the guide shaft 8.

During the descending operation, the engagement section 8b of the guide shaft 8 on the lower side is guided by the shaft support bearing BRG2 forming the case side shaft support section RAS2 to be centered. On the other hand, the pin engaging members 18 provided to both end areas of the rectangular plate 12 on the upper side are positioned by the knock pins np.

With this structure, the shaft support bearing BRG2 performs the centering, and the knock pin np also performs the centering. Further, the whole device 1 is supported by the end surface opening MCO from the lower side.

As described above, the measurement and adjustment of the position of the stator S is made possible in a state where the measurement adjustment device 1 is disposed in the stator S.

3-4 Measurement Step (Step #4)

Figure 14:
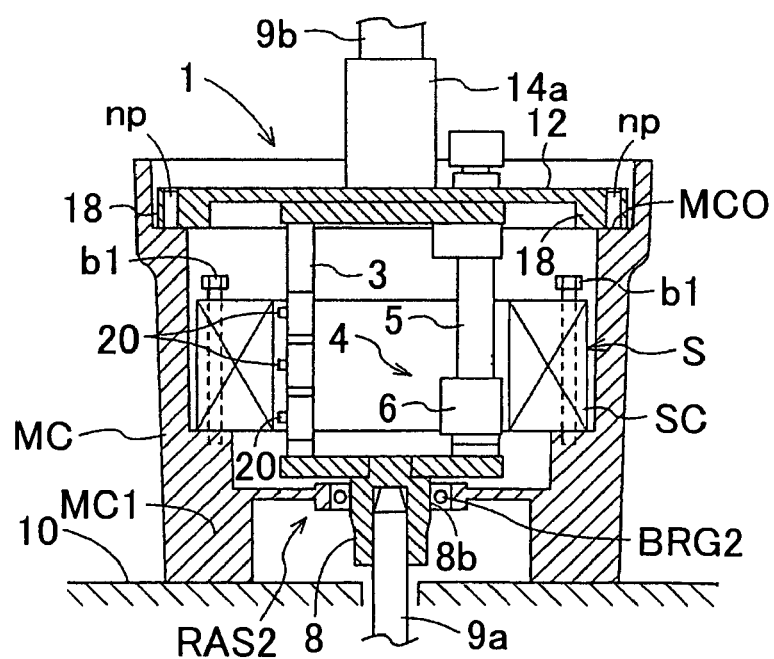
FIG. 14 is a view showing a state where a measurement is being performed by the measurement adjustment device.

That is, as shown in FIG. 14, the position of the inner diameter side end surface t1 of the teeth t provided to the stator core SC is measured as the output of each displacement sensor 20 by using the displacement sensor 20 in a state where the measurement adjustment device 1 is disposed in the transmission case MC. The measurement is sequentially performed by each stage shown below.

The stator axis position derivation unit 1cb that is formed to determine the position of the stator axis Zs based on the output of the displacement sensor 20, gathers the output of the displacement sensor 20 for each displacement sensor 20 in different vertical positions to determine the position of the center of the circle of the stator S in the different vertical positions (positions in the shaft direction D1). As a result, the position of the center of the circle at each height in the seat surface MC1 side, the intermediate position of the stator S, and the vicinity of the upper end area can be determined respectively as coordinates on a plane orthogonal to the shaft direction D1. Further, the position of the stator axis Zs (average position of the centers of the circles) is determined by averaging the obtained positions of the centers of the circles.

3-5 Judgment Step (Step #5)

Whether or not the position of the stator axis Zs determined as described above is within the first tolerance range Tr1 is judged. In the case where the stator axis Zs is within the first tolerance range Tr1 (step #5: YES), the adjustment operation can be completed.

On the other hand, in the case where the stator axis Zs is not within the first tolerance range Tr1 (step #5: NO), the following adjustment is performed. That is, at this stage, the adjustment command generation unit 1cc generates the adjustment command.

3-6 Adjustment Step (Step #6)

Figure 15:
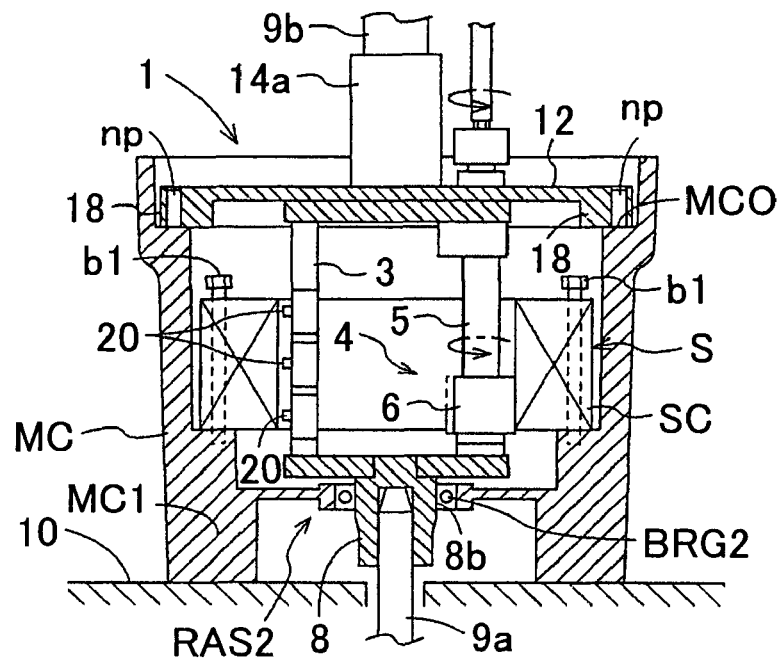
FIG. 15 is a view showing a state where an adjustment is being performed by the measurement adjustment device.

In this stage, the position of the stator S is adjusted such that the stator axis Zs approaches the rotor axis Zr based on the adjustment command that is generated separately, since the stator S is in an untightened free state as shown in FIG. 15. Specifically, the cam 6 that is on the side opposite to the direction in which the position of the stator axis Zs is eccentric with respect to that of the rotor axis Zr, is rotated to press the stator S to the outer diameter side in the area so that the position of the stator axis Zs comes within the first tolerance range Tr1. The position of the stator axis Zs according to the adjustment is displayed on the display device 101. The adjustment is suitably completed in a state where the adjustment is displayed on the display device 101 shown in FIG. 9. The position of the stator axis Zs in the completed state is within the first tolerance range Tr1, and is adjusted approximately to the origin, i.e., the position of the rotor axis Zr.

3-7 Tightening Step

Figure 16:
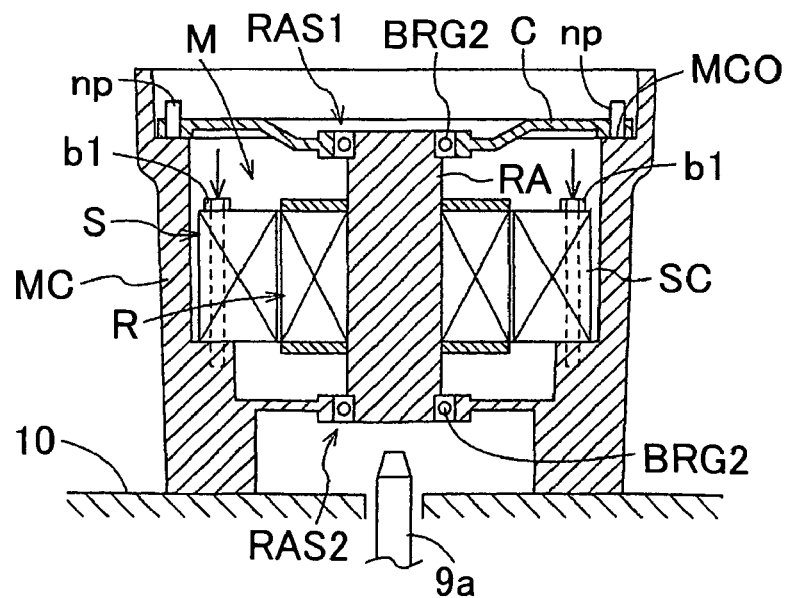
FIG. 16 is a view showing an assembled state where a rotor shaft is assembled.

After the adjustment is completed as described above, tightening is performed to provide a tightening state where the stator S is tightened to the transmission case MC using the tightening bolt b1 as shown in FIG. 16. The tightening force at this time is applied so as to secure the stator S to the transmission case MC.

The measurement adjustment device 1 is uninstalled from the transmission case MC and the rotor R is assembled, whereby the motor drive device M is completed.

By performing the measurement step and the adjustment step described above, the centering can be performed with an extremely high accuracy, whereby the stator can be prevented from contacting the motor case, even with the motor drive device M using the stacked stator core SC that can be deformed in a tightened state.

That is, the measurement adjustment device 1 is uninstalled from the transmission case MC and the rotor R is assembled after the operations relating to the stator are finished, whereby the motor drive device M is completed.

Alternative Embodiments (1) Although an example in which the first tolerance range is smaller than the second tolerance range has been shown in the embodiment described above, a configuration in which the both tolerance ranges are the same may also be employed.

(2) Although an example in which the position of the inner circumference surface of the motor case (transmission case MC) is set so as to be capable of forming the first gap g1 has been shown in the embodiment described above, a structure may also be applied in which the inner circumference surface of the motor case MC is partially expanded towards the outer diameter side.

Figure 17:
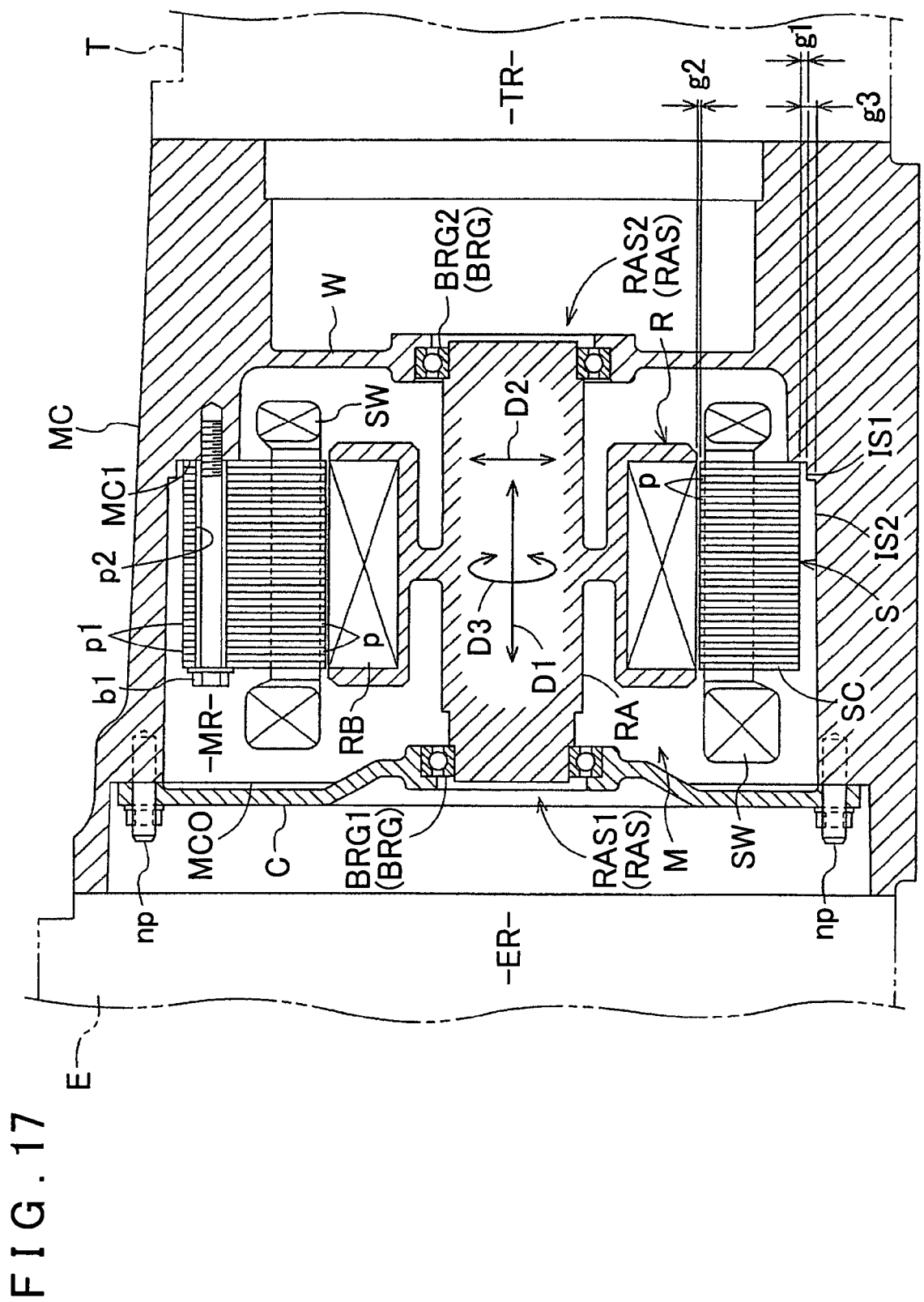
FIG. 17 is a sectional view showing the configuration of a motor drive device according to a first alternative embodiment.
Figure 18:
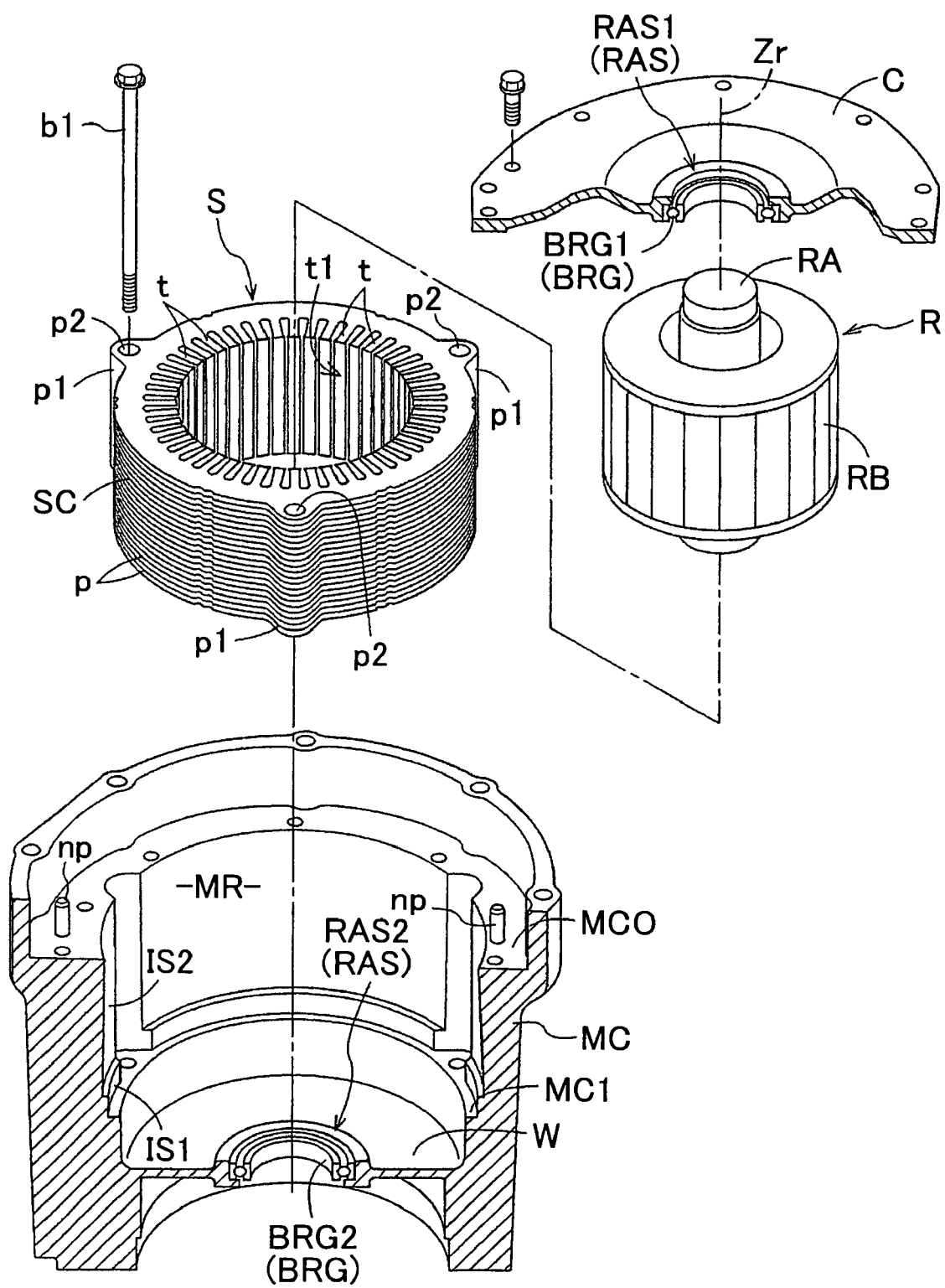
FIG. 18 is an exploded perspective view showing the configuration of the motor drive device according to the first alternative embodiment.

Such embodiments are shown in FIGS. 17 and 18. FIG. 17 is a drawing corresponding to FIG. 1, and FIG. 18 is a diagram corresponding to FIG. 2.

As can be seen from the two drawings, a first motor case inner circumference surface section IS1 having the first gap g1 described above and a second motor case inner circumference surface section IS2 having a third gap g3 larger than the first gap g1 are formed in the shaft direction with a step therebetween in this embodiment, regarding the gaps g1 and g3 formed between the outer circumference surface of the stator S and the inner circumference surface of the transmission case MC. That is, the second motor case inner circumference surface section IS2 is expanded toward the outer diameter side compared to the first motor case inner circumference surface section IS1.

Further, in this embodiment, the first motor case inner circumference surface section IS1 is provided on the seat surface MC1 side, and the second motor case inner circumference surface section IS2 is provided on the side farther from the seat surface MC1 than the first motor case inner circumference surface section IS1 (opening side that is the upper side in the drawing).

As a result of providing the motor case inner circumference surface section IS2 expanded toward the outer diameter side in this manner, inconvenience such as an unexpected contact of the stator S with the inner circumference surface of the transmission case MC can be avoided.

(3) Although the whole surface of the stator S in the circumferential direction is formed to contact the seat surface MC1 in the embodiment described above, a structure in which only a part of the stator S makes contact may also be applied.

Figure 19:
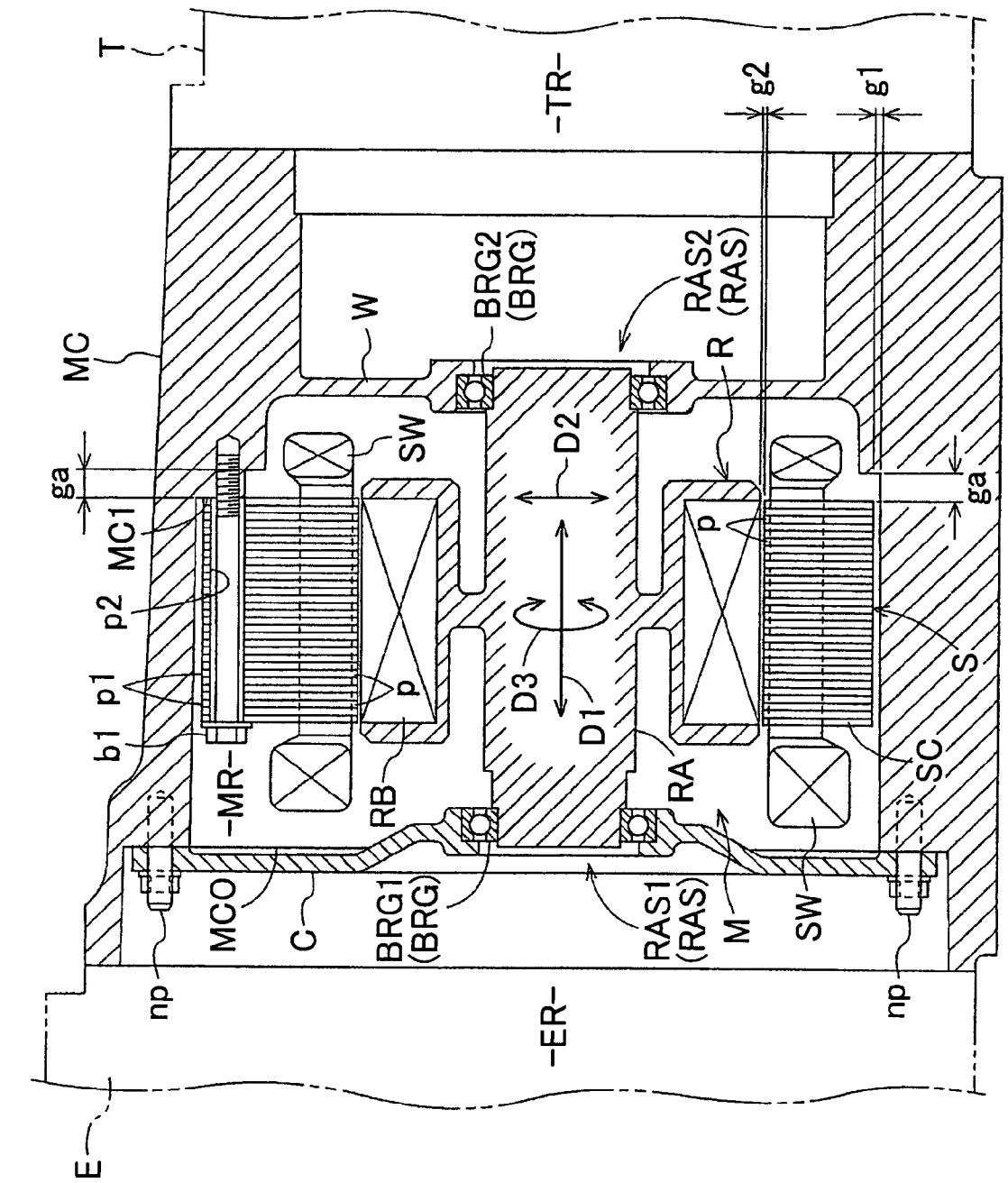
FIG. 19 is a sectional view showing the configuration of a motor drive device according to a second alternative embodiment.
Figure 20:
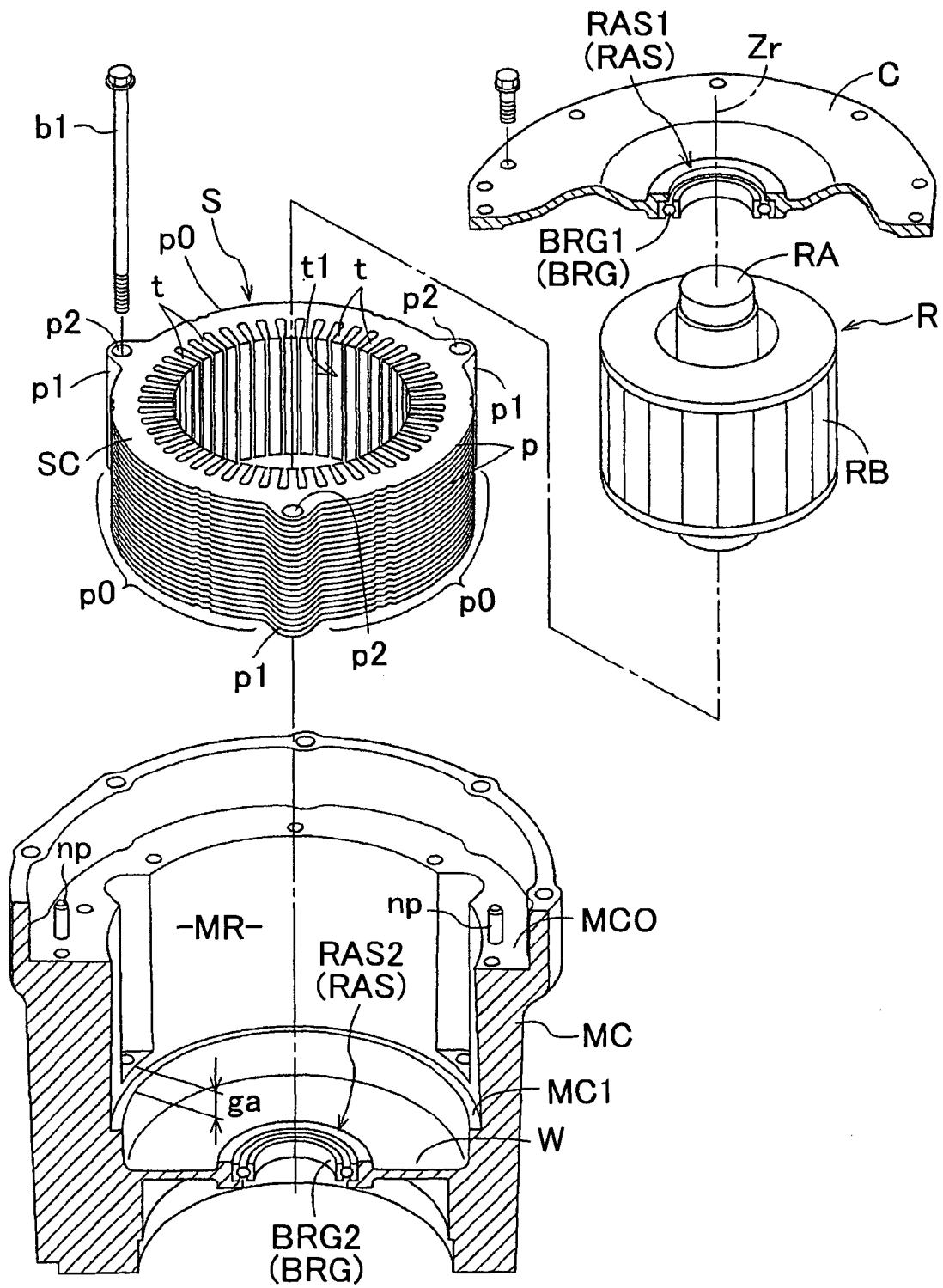
FIG. 20 is an exploded perspective view showing the configuration of the motor drive device according to the second alternative embodiment.

Such an embodiment is shown in FIGS. 19 and 20. FIG. 19 is a drawing corresponding to FIG. 1, and FIG. 20 is a diagram corresponding to FIG. 2.

In this embodiment, regarding the plurality of protruding sections p1 provided to the stator S in the circumferential direction, and the seat surface MC1 on which the protruding sections p1 are seated, a configuration is employed in which a shaft direction gap ga is formed between an ordinary outer circumference section p0 (see FIG. 20), excluding the protruding sections p1 in the circumferential direction of the stator S, and the motor case MC1.

As a result, the stator S and the motor case MC comes into contact only in the area where a strong tightening force is ensured. Since the area is naturally an area with small vibrations, the vibration (particularly sound) generated from the motor drive device can consequently be reduced in this embodiment as well.

(4) Although the centering of the measurement adjustment device is performed using both the shaft support bearing included in the case side shaft support section and the knock pin included in the end section opening in the embodiment described above, only one of the shaft support bearing included in the case side shaft support section and the knock pin included in the end section opening may also be used as the reference since the position in the shaft radial direction can substantially be determined by only one of the vertical directions, in the case where the operation of causing the axis of the measurement adjustment device to coincide with the axis of the rotor is performed in a vertical posture with the measurement adjustment device being supported in the vertical direction as in the embodiment described above.

(5) Although the stator inner surface areas arranged at four parts in the shaft circumferential direction D3 are subjected to the measurement and adjustment in the embodiment described above, the number of parts for the measurement and adjustment is not limited thereto. The measurement and adjustment are possible as long as there are at least three parts for the measurement and adjustment in the shaft circumferential direction. Note that the axis position of the stator S can be measured and adjusted more accurately with a greater number of parts for the measurement and adjustment. With four parts, it is advantageous in that the coordinates of the axis position in an orthogonal coordinate system can be directly measured and adjusted.

In addition, although the number of parts for the measurement and the number of parts for the adjustment are the same in the embodiment described above, the numbers may differ.

Further, regarding the phase in the shaft circumferential direction D3, the phase of the stator inner diameter surface area to be subjected to the measurement and the phase of the stator inner diameter surface area to be subjected to the adjustment may coincide. In this case, in order to suitably perform the adjustment of the stator core, it is preferable, in terms of measurement and adjustment, to perform the measurement with the displacement sensor installed in an area above the eccentric cam while maintaining the current position of the eccentric cam in the shaft direction (position in which the steel sheet in contact with the seat surface can be adjusted in the shaft radial direction). With this configuration, derivation of the adjustment amount is easier.

In addition, although three parts, arranged at even intervals in the shaft direction D1, of the inner surface of the stator S are used for the measurement by the displacement sensor 20 in the embodiment described above, the number of parts for the measurement is not limited thereto. The approximate arrangement state of the stator S along the shaft direction D1 can be measured as long as there are at least two parts, positioned on both end sides of the stator S, in the shaft direction D1, for the measurement. Note that the arrangement state of the stator S can be measured in more detail with a greater number of parts for the measurement.

(6) Although the eddy current displacement sensor is employed as the non-contact displacement sensor that selectively responds to a magnetic material or a conductive material in the embodiment described above, a displacement sensor of other types, such as a magnetic displacement sensor that detects the distance with respect to a magnetic material by a change of a magnetic field in the vicinity of the magnetic material caused by a magnetic induction, may be employed as the displacement sensor.

Further, an arbitrary sensor may be employed as long as the position of the inner circumference surface of the stator core can be detected.

(7) Although the position of the stator inner diameter surface is adjusted using the eccentric cam in the embodiment described above, an adjustment mechanism having the center at the axis of the rotor and including an adjustment area capable of increasing/decreasing the diameter may also be formed.

(8) Although the cam 6 is disposed in a position corresponding to the lower end section of the stator core SC, i.e., a position in the vicinity of a position in which the seat surface MC1 of the stator core SC comes into contact, in the embodiment described above, the disposition of the cam 6 is not limited thereto. That is, it suffices that the cam 6 be disposed in a position where the position of the stator S can appropriately be adjusted, and disposing the cam 6 so as to move an area lower than the middle of the stator S in the vertical direction is also one preferred embodiment.

(9) Although the measurement and adjustment are all performed automatically on the stator position adjustment system 100 side in the embodiment described above, it is also possible that the position of the stator S be measured by the measurement unit, and the position of the stator axis Zs determined by the measurement be displayed by the display device 101 as shown in FIG. 9 on the stator position adjustment system 100 side, and the adjustment operation be performed by the operator.

A stator position adjustment method that can obtain a motor drive device with low stator-induced vibration (particularly sound) due to the stator generated from the motor drive device, and a stator position adjustment system that can perform such a stator position adjustment are obtained.

According to an exemplary aspect of the invention, in a motor drive device that is applied with the stator position adjustment method, the first tolerance range is set, whereby the first gap is formed between the stator and the motor case as long as the position of the stator axis is adjusted within the first tolerance range. The first tolerance range is the maximum tolerance range of the stator axis in which the first gap is formed, and is a range beyond which the outer circumference surface of the stator contacts the inner circumference surface of the motor case (the first gap is eliminated).

According to the stator position adjustment method, measuring the position of the stator axis is performed in order to obtain the position of the stator, and the stator axis position is adjusted within the first tolerance range.

Accordingly, the first gap can reliably be ensured between the stator and the motor case by the stator axis being within the first tolerance range. That is, a state where the whole outer circumference of the stator does not contact the motor case is ensured.

Thus, an increase of vibration (particularly sound) generated from the motor drive device by a resonance of the stator caused by some factors can suitably be suppressed by avoiding the contact between the stator and the motor case.

According to an exemplary aspect of the invention, the first gap is ensured between the stator and the motor case, thus the occurrence of a vibration can be suppressed.

According to an exemplary aspect of the invention, in a motor drive device that is applied with the stator position adjustment method, the first tolerance range and the second tolerance range are set, whereby the first gap is formed between the stator and the motor case as long as the position of the stator axis is adjusted within the first tolerance range, and the second gap is formed between the stator and the rotor as long as the position of the stator axis is adjusted within the second tolerance range. The first tolerance range is the maximum tolerance range of the stator axis in which the first gap is formed, and is a range beyond which the outer circumference surface of the stator contacts the inner circumference surface of the motor case (the first gap is eliminated).

Similarly, the second tolerance range is the maximum tolerance range of the stator axis in which the second gap is formed, and is a range beyond which the inner circumference surface of the stator contacts the outer circumference surface of the rotor (the second gap is eliminated).

In the relation between the first tolerance range and the second tolerance range, the first tolerance range is less than or equal to the second tolerance range. The second tolerance range includes a range in which the contact between the stator and the motor case may occur, even under a condition in which the rotor and the stator do not make contact.

Thus, in the stator position adjustment method of the present invention, measuring the position of the stator axis is performed to obtain the position of the stator, and the stator axis position is adjusted within the first tolerance range.

Accordingly, the second gap between the stator and the rotor can reliably be ensured from the relation between the first tolerance range and the second tolerance range, and the first gap between the stator and the motor case can reliably be ensured by the stator axis being in the first tolerance range.

Thus, an increase of vibration (particularly sound) generated from the motor drive device by a resonance of the stator caused by some factor can suitably be suppressed by avoiding the contact between the stator and the motor case.

Further, in such a structure in which the first tolerance range is set to be less than or equal to the second tolerance range, the rotation of the rotor is ensured even if a movement of the stator has occurred in the shaft radial direction due to a loosening of the tightening unit, since the stator contacts the motor case first when the first tolerance range is less than the second tolerance range. When the first tolerance range is identical to the second tolerance range, the first gap and the second gap can be ensured as long as the stator axis is adjusted within the range, whereby a normal operation of the motor drive device can be ensured.

According to an exemplary aspect of the invention, the first gap and the second gap are ensured among the rotor, the stator, and the motor case, and the occurrence of a vibration can be suppressed.

In the stator position adjustment method of the second featured configuration of the present invention described above, the first tolerance range and the second tolerance range are preferably the same.

In the case where the first tolerance range and the second tolerance range are the same, the first gap formed between the stator and the motor case and the second gap formed between the stator and the rotor are set commensurately. In other words, the outer circumference side of the stator contacts the motor case and the inner circumference side of the stator contacts the rotor when the stator axis is beyond the first tolerance range (i.e., the second tolerance range).

That is, in this state, an adjustment of the rotor position can be performed to ensure the first gap and the second gap while increasing the first tolerance range as much as possible.

The condition in which the first tolerance range and the second tolerance range are set to be equal can obviously be employed in the motor drive device and the stator position adjustment system of the present invention to obtain the operations and effects described above.

According to an exemplary aspect of the invention, the motor drive device to be adjusted includes at least the first motor case inner circumference surface section and the second motor case inner circumference surface section in the shaft direction thereof (shaft direction of the motor drive device, i.e., a direction along which the stator axis or the rotor axis extends). The first motor case inner circumference surface section is an area in which the gap between the stator and the motor case described above is barely maintained, and the gap in the second motor case inner circumference surface section is the second gap larger than the first gap.

Therefore, a sufficient gap can be ensured in the second motor case inner circumference surface section, whereby interference between the stator and the motor case can be avoided.

According to an exemplary aspect of the invention, in the motor drive device having the configuration according to the present invention in which the stator is tightened by the tightening unit, the displacement on the seat surface side is minute, whereas the structure is more liable to displacement as the distance from the seat surface increases. Thus, a problem such as the stator unexpectedly contacting the motor case can easily be avoided by providing the first motor case inner circumference surface section in the vicinity of the seat surface and the second motor case inner circumference surface section to a position apart from the seat surface.

According to an exemplary aspect of the invention, a contact area in the shaft direction becomes an issue, regarding the contact between the stator and the motor case.

That is, in the case where the stator includes the protruding section, a structure is applied in which the protruding section is seated on and in contact with the seat surface, and in which the motor case is formed lower than the seat surface in the ordinary outer circumference section, where the protruding section is not formed, extending in the circumferential direction, whereby the shaft direction gap is formed between the stator and the motor case.

Accordingly, the contact area between the stator and the motor case is limited to the protruding section (that is, the area in which the stator is reliably tightened to the motor case by the tightening unit), whereby an occurrence of unnecessary vibration can be prevented and sound generated by the motor drive device can be reduced.

What is claimed is:

1. A stator position adjustment method for a motor drive device that includes a motor case, a rotor shaft supported by the motor case in order to rotate a rotor inside the motor case, and a stator disposed at an outer circumference of the rotor concentrically with the rotor and having a configuration in which the stator is tightened and secured to the motor case by a tightening unit that tightens the stator along a rotor axis, the method comprising:

setting a first tolerance range as a maximum tolerance range of a stator axis with respect to a motor case axis set for the motor case in which a first gap is formed between an outer circumference surface of the stator and an inner circumference surface of the motor case;

measuring a position of the stator axis; and adjusting the position of the stator axis with respect to the motor case axis set within the first tolerance range based on a measured position of the stator axis.

2. The stator position adjustment method according to claim 1, wherein a first motor case inner circumference surface section having the first gap and a second motor case inner circumference surface section having a second gap larger than the first gap are formed in a shaft direction.

3. The stator position adjustment method according to claim 2, wherein:

the motor case includes a seat surface on which an end surface of the stator in the shaft direction is seated; and the first motor case inner circumference surface section is provided on a side of the seat surface and the second motor case inner circumference surface section is provided on a side farther from the seat surface than the first motor case inner circumference surface section.

4. The stator position adjustment method according to claim 3, wherein:
the stator includes a protruding section formed on the outer circumference surface protruding outward in a radial direction in a plurality of areas in a circumferential direction;
the motor case includes the seat surface on which the protruding section is seated; and
regarding an ordinary outer circumference section excluding the protruding section in the circumferential direction of the stator, a shaft direction gap is formed between the ordinary outer circumference section and the motor case.

5. The stator position adjustment method according to claim 1, wherein:
the stator includes a protruding section formed on the outer circumference surface protruding outward in a radial direction in a plurality of areas in a circumferential direction;
the motor case includes the seat surface on which the protruding section is seated; and
regarding an ordinary outer circumference section excluding the protruding section in the circumferential direction of the stator, a shaft direction gap is formed between the ordinary outer circumference section and the motor case.

6. A stator position adjustment method for a motor drive device that includes a motor case, a rotor shaft supported by the motor case in order to rotate a rotor inside the motor case, and a stator disposed at an outer circumference of the rotor concentrically with the rotor and having a configuration in which the stator is tightened and secured to the motor case by a tightening unit that tightens the stator along a rotor axis, the method comprising:
setting a first tolerance range as a maximum tolerance range of a stator axis with respect to a motor case axis set for the motor case in which a first gap is formed between an outer circumference surface of the stator and an inner circumference surface of the motor case;
setting a second tolerance range as a maximum tolerance range of the stator axis in which a second gap is formed between an inner circumference surface of the stator and an outer circumference surface of the rotor, the first tolerance range being set less than or equal to the second tolerance range;
measuring a position of the stator axis; and
adjusting the position of the stator axis with respect to the motor case axis set within the first tolerance range based on a measured position of the stator axis.

7. The stator position adjustment method according to claim 6, wherein the first tolerance range is identical to the second tolerance range.

8. The stator position adjustment method according to claim 7, wherein a first motor case inner circumference surface section having the first gap and a second motor case inner circumference surface section having a third gap larger than the first gap are formed in a shaft direction.

9. The stator position adjustment method according to claim 8, wherein:
the motor case includes a seat surface on which an end surface of the stator in the shaft direction is seated; and
the first motor case inner circumference surface section is provided on a side of the seat surface and the second motor case inner circumference surface section is provided on a side farther from the seat surface than the first motor case inner circumference surface section.

10. The stator position adjustment method according to claim 9, wherein:
the stator includes a protruding section formed on the outer circumference surface protruding outward in a radial direction in a plurality of areas in a circumferential direction;
the motor case includes the seat surface on which the protruding section is seated; and
regarding an ordinary outer circumference section excluding the protruding section in the circumferential direction of the stator, a shaft direction gap is formed between the ordinary outer circumference section and the motor case.

11. The stator position adjustment method according to claim 6, wherein a first motor case inner circumference surface section having the first gap and a second motor case inner circumference surface section having a third gap larger than the first gap are formed in a shaft direction.

12. The stator position adjustment method according to claim 11, wherein:
the motor case includes a seat surface on which an end surface of the stator in the shaft direction is seated; and
the first motor case inner circumference surface section is provided on a side of the seat surface and the second motor case inner circumference surface section is provided on a side farther from the seat surface than the first motor case inner circumference surface section.

13. The stator position adjustment method according to claim 12, wherein:
the stator includes a protruding section formed on the outer circumference surface protruding outward in a radial direction in a plurality of areas in a circumferential direction;
the motor case includes the seat surface on which the protruding section is seated; and
regarding an ordinary outer circumference section excluding the protruding section in the circumferential direction of the stator, a shaft direction gap is formed between the ordinary outer circumference section and the motor case.

14. The stator position adjustment method according to claim 6, wherein:
the stator includes a protruding section formed on the outer circumference surface protruding outward in a radial direction in a plurality of areas in a circumferential direction;
the motor case includes the seat surface on which the protruding section is seated; and
regarding an ordinary outer circumference section excluding the protruding section in the circumferential direction of the stator, a shaft direction gap is formed between the ordinary outer circumference section and the motor case.

15. A motor drive device comprising:
a motor case;
a rotor shaft supported by the motor case in order to rotate a rotor inside the motor case; and
a stator disposed at an outer circumference of the rotor concentrically with the rotor, wherein:
the motor drive device having a configuration in which the stator is tightened and secured to the motor case by a tightening unit that tightens the stator along a rotor axis,
a stator axis being adjusted to a position within a first tolerance range as a maximum tolerance range of the stator axis in which a first gap is formed between an outer circumference surface of the stator and an inner circumference surface of the motor case throughout an entire circumference of the stator, the stator includes a protruding section formed on the outer circumference surface protruding outward in a radial direction in a plurality of areas in a circumferential direction, the motor case includes a seat surface on which the protruding section is seated, and regarding an ordinary outer circumference section excluding the protruding section in the circumferential direction of the stator, a shaft direction gap is formed between the ordinary outer circumference section and the motor case.

16. The motor drive device according to claim 15, wherein a first motor case inner circumference surface section having the first gap and a second motor case inner circumference surface section having a second gap larger than the first gap are formed in a shaft direction.

17. The motor drive device according to claim 16, wherein:

the motor case includes a seat surface on which an end surface of the stator in the shaft direction is seated; and the first motor case inner circumference surface section is provided on a side of the seat surface and the second motor case inner circumference surface section is provided on a side farther from the seat surface than the first motor case inner circumference surface section.

18. A motor drive device comprising:

a motor case;

a rotor shaft supported by the motor case in order to rotate a rotor inside the motor case; and a stator disposed at an outer circumference of the rotor concentrically with the rotor; wherein:

the motor drive device having a configuration in which the stator is tightened and secured to the motor case by a tightening unit that tightens the stator along a rotor axis, the motor drive device being set with a first tolerance range as a maximum tolerance range of a stator axis in which a first gap is formed between an outer circumference surface of the stator and an inner circumference surface of the motor case and a second tolerance range as a maximum tolerance range of the stator axis in which a second gap is formed between an inner circumference surface of the stator and an outer circumference surface of the rotor, the first tolerance range being set less than or equal to the second tolerance range, the stator axis being adjusted to a position within the first tolerance range, the stator includes a protruding section formed on the outer circumference surface protruding outward in a radial direction in a plurality of areas in a circumferential direction, the motor case includes a seat surface on which the protruding section is seated, and regarding an ordinary outer circumference section excluding the protruding section in the circumferential direction of the stator, a shaft direction gap is formed between the ordinary outer circumference section and the motor case.

19. The motor drive device according to claim 18, wherein the first tolerance range is identical to the second tolerance range.

20. The motor drive device according to claim 19, wherein a first motor case inner circumference surface section having the first gap and a second motor case inner circumference surface section having a third gap larger than the first gap are formed in a shaft direction.

21. The motor drive device according to claim 20, wherein:

the motor case includes a seat surface on which an end surface of the stator in the shaft direction is seated; and the first motor case inner circumference surface section is provided on a side of the seat surface and the second motor case inner circumference surface section is provided on a side farther from the seat surface than the first motor case inner circumference surface section.

22. The motor drive device according to claim 18, wherein a first motor case inner circumference surface section having the first gap and a second motor case inner circumference surface section having a third gap larger than the first gap are formed in a shaft direction.

23. The motor drive device according to claim 22, wherein:

the motor case includes a seat surface on which an end surface of the stator in the shaft direction is seated; and the first motor case inner circumference surface section is provided on a side of the seat surface and the second motor case inner circumference surface section is provided on a side farther from the seat surface than the first motor case inner circumference surface section.

24. A stator position adjustment system for a motor drive device that includes a motor case, a rotor shaft supported by the motor case in order to rotate a rotor inside the motor case, and a stator disposed at an outer circumference of the rotor concentrically with the rotor and having a configuration in which the stator is tightened and secured to the motor case by a tightening unit that tightens the stator along a rotor axis, the system comprising:

a storage unit that stores a first tolerance range as a maximum tolerance range of a stator axis with respect to a motor case axis set for the motor case in which a first gap is formed between an outer circumference surface of the stator and an inner circumference surface of the motor case;

a measurement unit that measures a position of the stator axis;

an adjustment unit that adjusts the position of the stator axis; and a controller that generates an adjustment command with respect to the adjustment unit to adjust the position of the stator axis with respect to the motor case axis set within the first tolerance range based on the position of the stator axis measured by the measurement unit.

25. A stator position adjustment system for a motor drive that includes a motor case, a rotor shaft supported by the motor case in order to rotate a rotor inside the motor case, and a stator disposed at an outer circumference of the rotor concentrically with the rotor and having a configuration in which the stator is tightened and secured to the motor case by a tightening unit that tightens the stator along a rotor axis, the system comprising:

a storage unit that stores a first tolerance range as a maximum tolerance range of a stator axis with respect to a motor case axis set for the motor case in which a first gap is formed between an outer circumference surface of the stator and an inner circumference surface of the motor case, and that stores a second tolerance range as a maximum tolerance range of the stator axis in which a second gap is formed between an inner circumference surface of the stator and an outer circumference surface of the rotor with the first tolerance range being set less than or equal to the second tolerance range;

a measurement unit that measures a position of the stator axis;

an adjustment unit that adjusts the position of the stator axis; and a controller that generates an adjustment command with respect to the adjustment unit to adjust the position of the stator axis with respect to the motor case axis set within the first tolerance range based on the position of the stator axis measured by the measurement unit.

26. The stator position adjustment system according to claim 25, wherein the first tolerance range is identical to the second tolerance range.

* * * * *